US011068499B2

(12) United States Patent
Ramamurthi et al.

(10) Patent No.: US 11,068,499 B2
(45) Date of Patent: Jul. 20, 2021

(54) METHOD, DEVICE, AND SYSTEM FOR PEER-TO-PEER DATA REPLICATION AND METHOD, DEVICE, AND SYSTEM FOR MASTER NODE SWITCHING

(71) Applicant: Huawei Technologies Co., Ltd., Guangdong (CN)

(72) Inventors: Prasanna Venkatesh Ramamurthi, Shenzhen (CN); Vamsi Krishna, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 1109 days.

(21) Appl. No.: 14/721,865

(22) Filed: May 26, 2015

(65) Prior Publication Data

US 2015/0317371 A1  Nov. 5, 2015

Related U.S. Application Data

(63) Continuation of application No. PCT/CN2014/089757, filed on Oct. 29, 2014.

(30) Foreign Application Priority Data

May 5, 2014 (IN) .......................... 2253/CHE/2014

(51) Int. Cl.
*G06F 16/20* (2019.01)
*G06F 16/27* (2019.01)

(52) U.S. Cl.
CPC .................................. *G06F 16/27* (2019.01)

(58) Field of Classification Search
None
See application file for complete search history.

(56) References Cited

U.S. PATENT DOCUMENTS 5,261,094 A   11/1993  Everson et al.
5,687,363 A   11/1997  Oulid-Aissa et al.
(Continued)

FOREIGN PATENT DOCUMENTS

CN   101809558 A   8/2010
CN   102253869 A   11/2011
(Continued)

OTHER PUBLICATIONS

Philip A. Bernstein, et al., "Adapting Microsoft SQL Server for Cloud Computing", ICDE Conference 2011, Apr. 11, 2011, p. 1255-1263.

(Continued)

*Primary Examiner* — Belix M Ortiz Ditren
(74) *Attorney, Agent, or Firm* — Rimon PC

(57) ABSTRACT

Method, device, and system for peer-to-peer data replication are provided. The method includes: generating a first commit redo record attached with a CSN when a first write operation happens on a first physical entity in a master node, wherein the master node is preset with the first physical entity and a second physical entity and is connected to a first subscriber node and a second subscriber node; pushing, the first commit redo record to a first subscriber node corresponding to the first physical entity based on mapping relationships between the physical entities and the subscriber nodes, wherein the first commit redo record is used for replicating data of the first write operation from the master node to the first subscriber node, and then to the second subscriber node through pushing, by the first subscriber node, the received first commit redo record to the second subscriber node.

12 Claims, 22 Drawing Sheets

(56) References Cited

U.S. PATENT DOCUMENTS

| | | |
|---|---|---|
| 5,737,601 A | 4/1998 | Jain et al. |
| 5,806,075 A | 9/1998 | Jain et al. |
| 5,937,414 A | 8/1999 | Souder et al. |
| 6,374,262 B1 | 4/2002 | Kodama |
| 6,615,223 B1 | 9/2003 | Shih et al. |
| 6,889,229 B1 | 5/2005 | Wong et al. |
| 6,901,433 B2 | 5/2005 | San Andres et al. |
| 7,305,451 B2 | 12/2007 | San Andres et al. |
| 7,333,982 B2 | 2/2008 | Bakalash et al. |
| 7,437,431 B2 | 10/2008 | San Andres et al. |
| 7,577,092 B2 | 8/2009 | San Andres et al. |
| 7,613,742 B2 | 11/2009 | Bohannon et al. |
| 7,613,751 B2 | 11/2009 | Tom et al. |
| 7,739,237 B2 | 6/2010 | Holenstein et al. |
| 7,966,285 B2 | 6/2011 | Sawadsky et al. |
| 8,041,670 B2 | 10/2011 | Bakalash et al. |
| 8,161,371 B2 | 4/2012 | Baldwin et al. |
| 8,170,984 B2 | 5/2012 | Bakalash et al. |
| 8,195,602 B2 | 6/2012 | Bakalash et al. |
| 2004/0153473 A1 | 8/2004 | Hutchinson et al. |
| 2005/0165858 A1 | 7/2005 | Tom et al. |
| 2005/0193024 A1 | 9/2005 | Beyer et al. |
| 2005/0203901 A1* | 9/2005 | Waldvogel .......... G06F 16/2471 |
| 2006/0047713 A1 | 3/2006 | Gornshtein et al. |
| 2006/0224757 A1 | 10/2006 | Fang et al. |
| 2009/0030986 A1* | 1/2009 | Bates .................. G06F 3/0607 |
| | | 709/205 |
| 2010/0145911 A1 | 6/2010 | Germer et al. |
| 2011/0137991 A1* | 6/2011 | Russell ................ G06Q 10/06 |
| | | 709/204 |
| 2011/0178984 A1* | 7/2011 | Talius ................ G06F 11/2094 |
| | | 707/634 |
| 2011/0251999 A1 | 10/2011 | Takahashi et al. |
| 2011/0289049 A1 | 11/2011 | Zeng et al. |
| 2012/0054158 A1 | 3/2012 | Hu et al. |
| 2016/0117377 A1* | 4/2016 | Barrall ............... G06F 21/6218 |
| | | 707/622 |

FOREIGN PATENT DOCUMENTS

| | | |
|---|---|---|
| JP | 2013-206209 A | 10/2013 |
| WO | WO 2009/018063 A2 | 2/2009 |
| WO | WO 2011/125127 A1 | 10/2011 |
| WO | WO 2013/189024 A1 | 12/2013 |

OTHER PUBLICATIONS

"Forest of trees topology", IBM, Aug. 2011, 1 page.
"IBM Informix Dynamic Server Enterprise Replication Guide", IBM, 1996, 2010, 455 pages.
"Hierarchical Tree Topology", IBM, Aug. 2011, 1 page.
"Master Replication Concepts and Architecture", Oracle, 2015, 54 pages.
"Peer-to-Peer Transactional Replication", Microsoft, 2015, 6 pages.
Steven Gribble, et al., "What Can Databases Do for Peer-to-Peer?", 6 pages.

* cited by examiner

A master node generates a first commit redo record attached with a commit sequence number (CSN), when a first write operation happens on a first physical entity in the master node, where the master node are preset with at least two physical entities including the first physical entity and a second physical entity and the master node is connected to at least two subscriber nodes including a first subscriber node and a second subscriber node, where the CSN attached in the first commit redo record is used for indicating the sequence of the first write operation within the master node ⎯ 301

The master node pushes the first commit redo record attached with the CSN to a first subscriber node corresponding to the first physical entity based on mapping relationships between the physical entities and the subscriber nodes, wherein the first commit redo record is used for replicating data of the first write operation from the master node to the first subscriber node corresponding to the first physical entity, and then to the second subscriber nodes through pushing, by the first subscriber node, the received first commit redo record, to the second subscriber node ⎯ 302

FIG. 3

METHOD, DEVICE, AND SYSTEM FOR PEER-TO-PEER DATA REPLICATION AND METHOD, DEVICE, AND SYSTEM FOR MASTER NODE SWITCHING

CROSS-REFERENCE TO RELATED APPLICATIONS

This application is a continuation of International Application No. PCT/CN2014/089757, filed on Oct. 29, 2014, which claims priority to India Patent Application No. IN2253/CHE/2014, filed on May 5, 2014, both of which are hereby incorporated by reference in their entireties.

TECHNICAL FIELD

The present invention relates to the field of computer technologies and, in particular, to method, device, and system for peer-to-peer data replication and method, device, and system for master node switching.

BACKGROUND

In many telecom and enterprise applications a single-master RDBMS (Relational Database Management System) replication is the norm. There is one node which acts as a master, on which writes can be performed. Then these writes are synchronized to one or more subscribers by replicating either the physical writes or replicating the Structured Query Language (SQL) statements (i.e., the logical writes).

FIG. 1 is a single master replication topology in the prior art. As shown in FIG. 1, an application is connected to the master database (master node). This application is allowed to write on the database through SQL statements (Data Manipulation Language (DML) or Data Definition Language (DDL)). Once the write is successful, the master database replicates the data to subscriber databases 1 and 2. The replication could be done by physical replication or logical replication, and could be asynchronous or synchronous. FIG. 2 is a schematic diagram of a standard implementation of a replication according to the single master replication topology as shown in FIG. 1. As shown in FIG. 2, the application push DML/DDL statement to the master database S201, the master database parses the DML/DDL statement S202, and then executes the DML/DDL statement S203, which results in a physical write in the database S204. This physical write could be in the memory pages of the master node or could be a direct input/output (I/O) write into the storage disk of the master database. Once this write is successful, the master database judges whether need to replicate the data being written to any subscriber database connected to this master database S205; if no, the master database finishes the replication S206; if yes, the master database sends redo entities to each subscriber database connected to this master database to replicate the data being written to the subscriber databases S207, where the procedure of replicate the data is as similar as the above procedure of the write operation, and where the SQL statements are shipped instead of physical redo.

The above prior art has a major weakness of a single network bottleneck. The master node becomes a bottleneck to the whole solution. According to the single master replication topology shown in FIG. 1, the master database has to replicate the same data twice, hence incurs twice the network load.

SUMMARY

Embodiments of the present invention provide method, device, and system for peer-to-peer data replication and method, device, and system for master node switching, so as to mitigate the replication bottleneck from the master node in a replication cluster by distributing the replication in a peer-peer mode.

Embodiments of the present invention adopt the following technical solutions.

A first aspect of the present invention provides a method for peer-to-peer data replication, including:

generating, by a master node, a first commit redo record attached with a commit sequence number (CSN), when a first write operation happens on a first physical entity in the master node, where the master node is preset with at least two physical entities including the first physical entity and a second physical entity and the master node is connected to at least two subscriber nodes including a first subscriber node and a second subscriber node, where the CSN attached in the first commit redo record is used for indicating the sequence of the first write operation within the master node; and pushing, by the master node, the first commit redo record attached with the CSN to a first subscriber node corresponding to the first physical entity based on mapping relationships between the physical entities and the subscriber nodes, where the first commit redo record is used for replicating data of the first write operation from the master node to the first subscriber node corresponding to the first physical entity, and then to the second subscriber node through pushing, by the first subscriber node, the received first commit redo record, to the second subscriber node.

In a first implementation of the first aspect of the present invention, the physical entities are table space, device files, pages and/or partitions.

In a second implementation of the first aspect of the present invention, the mapping relationships between the physical entities and the subscriber nodes are established by the master node by mapping different subscriber nodes to different connections between the master node and the subscriber nodes, and by mapping different connections to different sets of physical entities in the master node, where each set of physical entities includes one or multiple physical entities;

and the pushing, by the master node, the first commit redo record attached with the CSN to a first subscriber node corresponding to the first physical entity based on mapping relationships between the physical entities and the subscriber nodes, includes:

pushing, by the master node, the first commit redo record attached with the CSN to the first subscriber node corresponding to the first physical entity based on the mapping relationship between the first physical entity and the first subscriber node through a connection between the master node and the first subscriber node.

In a third implementation of the first aspect of the present invention, the mapping relationships between the physical entities and the subscriber nodes are established by the master node by mapping different subscriber nodes to different connections between the master node and the subscriber nodes, and by mapping different connections to different sets of physical entities in the master node, where each set of physical entities in the master node includes multiple physical entities, and further by mapping different physical entities in one set of physical entities in the master node to different physical entities in the subscriber node corresponding to the set of physical entities;

and the pushing, by the master node, the first commit redo record attached with the CSN to the first subscriber node corresponding to the first physical entity based on mapping relationships between the physical entities and the subscriber nodes, includes:

pushing, by the master node, the first commit redo record attached with the CSN to a third physical entity corresponding to the first physical entity, where the first subscriber node is preset with at least two physical entities including the third physical entity and a fourth physical entity, based on the mapping relationship between the set of physical entities to which the first physical entity belongs and that is of the master node and the first subscriber node and the mapping relationship between the first physical entity and the third physical entity, through a connection between the master node and the first subscriber node.

In a fourth implementation of the first aspect of the present invention, when a new subscriber node is connected to the master node, further including:

synchronizing, by the master node, commit redo records to the new subscriber node after physical entities in the master node and mapping relationships between the physical entities and the subscriber nodes including the new subscriber node are reconfigured.

In a fifth implementation of the first aspect of the present invention, the first commit record is separated from a second commit record, which is generated by the master node when a second write operation happens on a second physical entity, based on physical entities on which the related write operation happens.

In a sixth implementation of the first aspect of the present invention, the first commit record and the second commit record are pushed, in parallel, by the master node, to the first subscriber node and the second subscriber node, respectively, so that the first commit record and the second commit record are replayed, in parallel, by the first subscriber node and the second subscriber node, respectively; where, the second commit redo record is used for replicating data of the second write operation from the master node to the second subscriber node corresponding to the second physical entity, and then to the first subscriber node through pushing, by the second subscriber node, the received second commit redo record, to the first subscriber node.

A second aspect of the present invention provides a method for peer-to-peer data replication, including:

receiving, by a subscriber node, a commit redo record attached with a commit sequence number (CSN) from a master node, where the CSN attached in the commit redo record is used for indicating the sequence of a write operation within the master node;

updating a CSN of the subscriber node to the CSN attached to the commit redo record, when an absolute value of CSN attached to the commit redo record minus the CSN of the subscriber node is 1, where the CSN of the subscriber node is set to 0 during an initialization;

replaying, by the subscriber node, the commit redo record to replicate data of a write operation happened on a master node from the master node to the subscriber node, where the subscriber node is connected to the master node and other subscriber nodes connected to the master node; and pushing, by the subscriber node, the commit redo record to the other subscriber nodes, to replicate the data of the write operation happened on the master node to the other subscribers.

In a first implementation of the second aspect of the present invention, further including:

saving, by the subscriber node, the received commit redo record and waiting for another commit redo record, when the absolute value of the CSN attached to the received commit redo record minus the CSN of the subscriber node is not 1; and replaying, by the subscriber node, the commit redo record to replicate data of the write operation happened on the master node from the master node to the subscriber node, after the CSN of the subscriber node is updated to a value that the absolute value of the CSN attached to the received commit redo record minus the updated CSN of the subscriber node is 1.

In a second implementation of the second aspect of the present invention, further including:

transmitting, by the subscriber node, a pull request to all other subscriber nodes to get all data of the write operation happened on the master node, which is obtained by replaying the commit redo record, in the other subscriber nodes after the master node is down and the subscriber node is elected to be a new master node; and reassigning, by the subscriber node which is acted as the new master node, mapping relationships between physical entities in the new master node and the other subscriber nodes other than the subscriber node.

In a third implementation of the second aspect of the present invention, further including:

transmitting, by the subscriber node, the data of the write operation happened on the former master node in the subscriber node to a subscriber node which is acted as a new master node in response to a pull request transmitted by the new master node, after the former master node is down and another subscriber node is elected to be the new master node.

A third aspect of the present invention provides a method for master node switching, including:

performing, by a subscriber node among at least two subscriber nodes, when a master node is down, data synchronization among the subscriber node and the other subscriber nodes until the data synchronization is finished or a pre-configured time period for the data synchronization is reached, where the subscriber nodes and the master node are in a same cluster;

transmitting, by the subscriber node which is acted as a new master node, a pull request to the remaining subscriber nodes which are not elected to be the new master node, after the subscriber node is selected from the subscriber nodes to be the new master node based on a highest commit sequence number (CSN) of the subscriber nodes; and receiving, by the subscriber node which is acted as the new master node, data from the remaining subscriber nodes which are not elected to be the new master node.

In a first implementation of the third aspect of the present invention, further including:

establishing, by the subscriber node which is acted as the new master node, mapping relationships between physical entities in the new master node and the other subscriber nodes other than the subscriber node; and performing, by the subscriber node which is acted as the new master node, peer-to-peer data replication between the new master node and the other subscriber nodes which are not elected to be the new master node according to the mapping relationships, when a write operation happens on the physical entity in the new master node.

A fourth aspect of the present invention provides a method for master node switching, including:

performing, by a subscriber node among at least two subscriber nodes, when a master node is down, data synchronization among the subscriber node and the other subscriber nodes until the data synchronization is finished or a pre-configured time period for the data synchronization is reached, where the subscriber nodes and the master node are in a same cluster;

electing, by the subscriber node together with the other subscriber nodes, a subscriber node to be a new master node from the subscriber nodes based on a highest commit sequence number (CSN) of the subscriber nodes;

receiving, by the subscriber node which is not elected to be the new master node, a pull request issued by the new master node; and transmitting, by the subscriber node which is not elected to be the new master node, data in the subscriber node to a new master node in response to the pull request transmitted by the new master node.

A fifth aspect of the present invention provides a device for peer-to-peer data replication, where the device is positioned on a master node, where the device includes:

a generating unit, configured to generate a first commit redo record attached with a commit sequence number (CSN), when a first write operation happens on a first physical entity in the master node, where the master node is preset with at least two physical entities including the first physical entity and a second physical entity and the master node is connected to at least two subscriber nodes including a first subscriber node and a second subscriber node, where the CSN attached in the first commit redo record is used for indicating the sequence of the first write operation within the master node; and a replicating unit, configured to push the first commit redo record attached with the CSN to a first subscriber node corresponding to the first physical entity based on mapping relationships between the physical entities and the subscriber nodes, where the first commit redo record is used for replicating data of the first write operation from the master node to the first subscriber node corresponding to the first physical entity, and then to the second subscriber node through pushing, by the first subscriber node, the received first commit redo record, to the second subscriber node.

In a first implementation of the fifth aspect of the present invention, the physical entities are table space, device files, pages and/or partitions.

In a second implementation of the fifth aspect of the present invention, further including:

a first mapping unit, configured to establish the mapping relationships between the physical entities and the subscriber nodes by mapping different subscriber nodes to different connections between the master node and the subscriber nodes, and by mapping different connections to different sets of physical entities in the master node, where each set of physical entities includes one or multiple physical entities;

and the replicating unit is specifically configured to push the first commit redo record attached with the CSN to the first subscriber node corresponding to the first physical entity based on the mapping relationship between the first physical entity and the first subscriber node through a connection between the master node and the first subscriber node, where the first commit redo record is used for replicating data of the first write operation from the master node to the first subscriber node corresponding to the first physical entity, and then to the second subscriber node through pushing, by the first subscriber node, the received first commit redo record, to the second subscriber node.

In a third implementation of the fifth aspect of the present invention, further including:

a second mapping unit, configured to establish the mapping relationships between the physical entities and the subscriber nodes by mapping different subscriber nodes to different connections between the master node and the subscriber nodes, and by mapping different connections to different sets of physical entities in the master node, where each set of physical entities in the master node includes multiple physical entities, and further by mapping different physical entities in one set of physical entities in the master node to different physical entities in the subscriber node corresponding to the set of physical entities;

and the replicating unit is specifically configured to push the first commit redo record attached with the CSN to a third physical entity corresponding to the first physical entity, where the first subscriber node is preset with at least two physical entities including the third physical entity and a fourth physical entity, based on the mapping relationship between the set of physical entities to which the first physical entity belongs and that is of the master node and the first subscriber node and the mapping relationship between the first physical entity and the third physical entity, through a connection between the master node and the first subscriber node, where the first commit redo record is used for replicating data of the first write operation from the master node to the first subscriber node corresponding to the first physical entity, and then to the second subscriber node through pushing, by the first subscriber node, the received first commit redo record, to the second subscriber node.

In a fourth implementation of the fifth aspect of the present invention, the replicating unit is further configured to, when a new subscriber node is connected to the master node, synchronize commit redo records to the new subscriber node after physical entities in the master node and mapping relationships between the physical entities and the subscriber nodes including the new subscriber node are reconfigured.

In a fifth implementation of the fifth aspect of the present invention, the first commit record is separated from a second commit record, which is generated by the device when a second write operation happens on a second physical entity, based on physical entities on which the related write operation happens.

In a sixth implementation of the fifth aspect of the present invention, the first commit record and the second commit record are pushed, in parallel, by the replicating unit, to the first subscriber node and the second subscriber node, respectively, so that the first commit record and the second commit record are replayed, in parallel, by the first subscriber node and the second subscriber node, respectively; where, the second commit redo record is used for replicating data of the second write operation from the master node to the second subscriber node corresponding to the second physical entity, and then to the first subscriber node through pushing, by the second subscriber node, the received second commit redo record, to the first subscriber node.

A sixth aspect of the present invention provides a device for peer-to-peer data replication, where the device is positioned on a subscriber node, where the device includes:

a receiving unit, configured to receive a commit redo record attached with a commit sequence number (CSN) from a master node, where the CSN attached in the commit redo record is used for indicating the sequence of a write operation within the master node;

a CSN processing unit, configured to update a CSN of the subscriber node to the CSN attached to the commit redo record, when an absolute value of the CSN attached to the commit redo record minus the CSN of the subscriber node is 1, where the CSN of the subscriber node is set to 0 during an initialization; and a replicating unit, configured to replay the commit redo record to replicate data of a write operation happened on a master node from the master node to the subscriber node, where the subscriber node is connected to the master node and other subscriber nodes connected to the master node; and push the commit redo record to the other subscriber nodes, to replicate the data of the write operation happened on the master node to the other subscribers.

In a first implementation of the sixth aspect of the present invention, the CSN processing unit is further configured to save the received commit redo record and wait for another commit redo record, when the absolute value of the CSN attached to the received commit redo record minus the CSN of the subscriber node is not 1; and the replicating unit is further configured to replay the commit redo record to replicate data of the write operation happened on the master node from the master node to the subscriber node, after the CSN of the subscriber node is updated to a value that the absolute value of the CSN attached to the received commit redo record minus the updated CSN of the subscriber node is 1.

In a second implementation of the sixth aspect of the present invention, the replicating unit is further configured to transmit a pull request to all other subscriber nodes to get all data of the write operation happened on the master node, which is obtained by replaying the commit redo record, in the other subscriber nodes after the master node is down and the subscriber node is elected to be a new master node; and the device further includes:

a mapping unit, configured to, when the subscriber node is acted as the new master node, reassign mapping relationships between physical entities in the new master node and the other subscriber nodes other than the subscriber node which is act as the new master node.

In a third implementation of the sixth aspect of the present invention, the replicating unit is further configured to transmit the data of the write operation happened on the former master node in the subscriber node to a subscriber node which is acted as a new master node in response to a pull request transmitted by the new master node, after the former master node is down and another subscriber node is elected to be the new master node.

A seventh aspect of the present invention provides a device for master node switching, where the device is positioned on a subscriber node, where the device includes:

a synchronizing unit, configured to, when a master node is down, perform data synchronization among the subscriber node and the other subscriber nodes until the data synchronization is finished or a pre-configured time period for the data synchronization is reached, where the subscriber nodes and the master node are in a same cluster;

a transmitting unit, configured to transmit a pull request to the remaining subscriber nodes which are not elected to be a new master node, after the subscriber node is selected from the subscriber nodes to be the new master node based on a highest commit sequence number (CSN) of the subscriber nodes; and a receiving unit, configured to receive data from the remaining subscriber nodes which are not elected to be the new master node.

In a first implementation of the seventh aspect of the present invention, further including:

a mapping unit, configured to, when the subscriber node is acted as the new master node, establish mapping relationships between physical entities in the new master node and the other subscriber nodes other than the subscriber node;

and the synchronizing unit is further configured to perform peer-to-peer data replication between the new master node and the other subscriber nodes which are not elected to be the new master node according to the mapping relationships, when a write operation happens on the physical entity in the new master node.

An eighth aspect of the present invention provides a device for master node switching, where the device is positioned on a subscriber node, where the device includes:

a synchronizing unit, configured to, when a master node is down, perform data synchronization among the subscriber node and the other subscriber nodes until the data synchronization is finished or a pre-configured time period for the data synchronization is reached, where the subscriber nodes and the master node are in a same cluster;

an electing unit, configured to, together with the other subscriber node, elect a subscriber node to be a new master node from the subscriber nodes based on a highest commit sequence number (CSN) of the subscriber node;

a receiving unit, configured to, when the subscriber node is not elected to be the new master node, receive a pull request issued by the new master node; and a transmitting unit, configured to, when the subscriber node is not elected to be the new master node, transmit data in the subscriber node to a new master node in response to the pull request transmitted by the new master node.

A ninth aspect of the present invention provides a device for peer-to-peer data replication, where the device is positioned on a master node, where the device includes:

a processor and a memory coupled to the processor;

where the processor is configured to:

generate a first commit redo record attached with a commit sequence number (CSN), when a first write operation happens on a first physical entity in the master node, where the master node is preset with at least two physical entities including the first physical entity and a second physical entity and the master node is connected to at least two subscriber nodes including a first subscriber node and a second subscriber node, where the CSN attached in the first commit redo record is used for indicating the sequence of the first write operation within the master node; and push the first commit redo record attached with the CSN to a first subscriber node corresponding to the first physical entity based on mapping relationships between the physical entities and the subscriber nodes, where the first commit redo record is used for replicating data of the first write operation from the master node to the first subscriber node corresponding to the first physical entity, and then to the second subscriber node through pushing, by the first subscriber node, the received first commit redo record, to the second subscriber node.

In a first implementation of the ninth aspect of the present invention, the physical entities are table space, device files, pages and/or partitions.

In a second implementation of the ninth aspect of the present invention, the processor is further configured to:

establish the mapping relationships between the physical entities and the subscriber nodes by mapping different subscriber nodes to different connections between the master node and the subscriber nodes, and by mapping different connections to different sets of physical entities in the master node, where each set of physical entities includes one or multiple physical entities; and push the first commit redo record attached with the CSN to the first subscriber node corresponding to the first physical entity based on the mapping relationship between the first physical entity and the first subscriber node through the connection between the master node and the first subscriber node.

In a third implementation of the ninth aspect of the present invention, the processor is further configured to:

establish the mapping relationships between the physical entities and the subscriber nodes by mapping different subscriber nodes to different connections between the master node and the subscriber nodes, and by mapping different connections to different sets of physical entities in the master node, where each set of physical entities in the master node includes multiple physical entities, and further by mapping different physical entities in one set of physical entities in the master node to different physical entities in the subscriber node corresponding to the set of physical entities; and push the first commit redo record attached with the CSN to a third physical entity corresponding to the first physical entity, where the first subscriber node is preset with at least two physical entities including the third physical entity and a fourth physical entity, based on the mapping relationship between the set of physical entities to which the first physical entity belongs and that is of the master node and the first subscriber node and the mapping relationship between the first physical entity and the third physical entity, through the connection between the master node and the first subscriber node.

In a fourth implementation of the ninth aspect of the present invention, the processor is further configured to:

when a new subscriber node is connected to the master node, synchronize commit redo records to the new subscriber node after physical entities in the master node and mapping relationships between the physical entities and the subscriber nodes including the new subscriber node are reconfigured.

In a fifth implementation of the ninth aspect of the present invention, the first commit record is separated from a second commit record, which is generated by the device when a second write operation happens on a second physical entity, based on physical entities on which the related write operation happens.

In a sixth implementation of the ninth aspect of the present invention, the first commit record and the second commit record are pushed, in parallel, by the processor, to the first subscriber node and the second subscriber node, respectively, so that the first commit record and the second commit record are replayed, in parallel, by the first subscriber node and the second subscriber node, respectively; where, the second commit redo record is used for replicating data of the second write operation from the master node to the second subscriber node corresponding to the second physical entity, and then to the first subscriber node through pushing, by the second subscriber node, the received second commit redo record, to the first subscriber node.

A tenth aspect of the present invention provides a device for peer-to-peer data replication, where the device is positioned on a subscriber node, where the device includes:

a processor and a memory coupled to the processor;

where the processor is configured to:

receive a commit redo record attached with a commit sequence number (CSN) from a master node, where the CSN attached in the commit redo record is used for indicating the sequence of a write operation within the master node;

update a CSN of the subscriber node to the CSN attached to the commit redo record, when an absolute value of the CSN attached to the commit redo record minus the CSN of the subscriber node is 1, where the CSN of the subscriber node is set to 0 during an initialization;

replay the commit redo record to replicate data of a write operation happened on a master node from the master node to the subscriber node, where the subscriber node is connected to the master node and other subscriber nodes connected to the master node; and push the commit redo record to the other subscriber nodes, to replicate the data of the write operation happened on the master node to the other subscribers.

In a first implementation of the tenth aspect of the present invention, the processor is further configured to:

save the received commit redo record and wait for another commit redo record, when the absolute value of the CSN attached to the received commit redo record minus the CSN of the subscriber node is not 1; and replay the commit redo record to replicate data of the write operation happened on the master node from the master node to the subscriber node, after the CSN of the subscriber node is updated to a value that the absolute value of the CSN attached to the received commit redo record minus the updated CSN of the subscriber node is 1.

In a second implementation of the tenth aspect of the present invention, the processor is further configured to:

transmit a pull request to all other subscriber nodes to get all data of the write operation happened on the master node, which is obtained by replaying the commit redo record, in the other subscriber nodes after the master node is down and the subscriber node is elected to be a new master node; and a mapping unit, configured to, when the subscriber node is acted as the new master node, reassign mapping relationships between physical entities in the new master node and the other subscriber nodes other than the subscriber node which is act as the new master node.

In a third implementation of the tenth aspect of the present invention, the processor is further configured to:

transmit the data of the write operation happened on the former master node in the subscriber node to a subscriber node which is acted as a new master node in response to a pull request transmitted by the new master node, after the former master node is down and another subscriber node is elected to be the new master node.

An eleventh aspect of the present invention provides a device for master node switching, where the device is positioned on a subscriber node, where the device includes:

a processor and a memory coupled to the processor;

where the processor is configured to:

when a master node is down, perform data synchronization among the subscriber node and the other subscriber nodes until the data synchronization is finished or a preconfigured time period for the data synchronization is reached, where the subscriber nodes and the master node are in a same cluster;

transmit a pull request to the remaining subscriber nodes which are not elected to be a new master node, after the subscriber node is selected from the subscriber nodes to be the new master node based on a highest commit sequence number (CSN) of the subscriber nodes; and receive data from the remaining subscriber nodes which are not elected to be the new master node.

In a first implementation of the eleventh aspect of the present invention, the processor is further configured to:

when the subscriber node is acted as the new master node, establish mapping relationships between physical entities in the new master node and the other subscriber nodes other than the subscriber node; and when a write operation happens on the physical entity in the new master node, perform peer-to-peer data replication between the new master node and the other subscriber nodes which are not elected to be the new master node according to the mapping relationships.

A twelfth aspect of the present invention provides a device for master node switching, where the device is positioned on a subscriber node, where the device includes:

a processor and a memory coupled to the processor;

where the processor is configured to:

when a master node is down, perform data synchronization among the subscriber node and the other subscriber nodes until the data synchronization is finished or a pre-configured time period for the data synchronization is reached, where the subscriber nodes and the master node are in a same cluster;

together with the other subscriber node, elect a subscriber node to be a new master node from the subscriber nodes based on a highest commit sequence number (CSN) of the subscriber node;

when the subscriber node is not elected to be the new master node, receive a pull request issued by the new master node; and when the subscriber node is not elected to be the new master node, transmit data in the subscriber node to a new master node in response to the pull request transmitted by the new master node.

A thirteenth aspect of the present invention provides a single master cluster system, including a master node and at least two subscriber nodes including a first subscriber node and a second subscriber node, where:

on the master node, a device for peer-to-peer data replication according to any one of the fifth aspect, the ninth aspect and implementations thereof is positioned; and on each of the subscriber node, a device for peer-to-peer data replication according to any one of the sixth aspect, the tenth aspect and implementations thereof is positioned.

A fourteenth aspect of the present invention provides a single master cluster system, including a master node and at least two subscriber nodes, where:

on each of the subscriber nodes, both a device for master node switching according to any one of the seventh aspect, the eleventh aspect and implementations thereof and a device for master node switching according to the eighth aspect, the twelfth aspect and implementations thereof are positioned.

According to the method, device and system for peer-to-peer data replication provided by embodiments of the present invention, the master node separates the commit redo records generated when write operations happens on the master node into multiple commit redo records, and pushes the multiple commit redo records different subscribers, where each of the multiple commit redo records is pushed by the master node to only one subscriber, and then to other subscriber nodes through pushing by the only one subscriber receiving the commit redo record, thereby reducing the transmission between the master node and the subscriber nodes and, thus, mitigating the replication bottleneck from the master node in a replication cluster.

According to the method, device, and system for master node switching provided by embodiments of the present invention, when the master node is down, the subscriber nodes have ability to make a cluster including the subscriber nodes recover and return to work quickly.

BRIEF DESCRIPTION OF THE DRAWINGS

In order to illustrate the technical solutions in embodiments of the present invention or the prior art more clearly, accompanying drawings needed in the embodiments or the prior art are illustrated briefly in the following. It is evident that the accompanying drawings are only some embodiments of the present invention, and persons skilled in the art may obtain other drawings according to the accompanying drawings without creative efforts.

FIG. 3 is a flowchart of a method for peer-to-peer data replication according to an embodiment of the present invention;

DETAILED DESCRIPTION

The technical solutions in the embodiments of the present invention are clearly and fully described in the following with reference to the accompanying drawings in the embodiments of the present invention. Obviously, the embodiments to be described are only a part rather than all of the embodiments of the present invention. Based on the embodiments of the present invention, all other embodiments obtained by persons skilled in the art without creative efforts shall fall within the protection scope of the present invention.

Embodiments of the present invention provide a method for peer-to-peer data replication. FIG. 3 is a flowchart of a method for peer-to-peer data replication according to an embodiment of the present invention. As shown in FIG. 3, the method includes the following steps.

301. A master node generates a first commit redo record attached with a commit sequence number (CSN), when a first write operation happens on a first physical entity in the master node, where the master node is preset with at least two physical entities including the first physical entity and a second physical entity and the master node is connected to at least two subscriber nodes including a first subscriber node and a second subscriber node, where the CSN attached in the first commit redo record is used for indicating the sequence of the first write operation within the master node.

302. The master node pushes the first commit redo record attached with the CSN to a first subscriber node corresponding to the first physical entity based on mapping relationships between the physical entities and the subscriber nodes, where the first commit redo record is used for replicating data of the first write operation from the master node to the first subscriber node corresponding to the first physical entity, and then to the second subscriber nodes through pushing, by the first subscriber node, the received first commit redo record, to the second subscriber node.

Herein, the master node is a node including a master database, and the subscriber node is a node including a subscriber database, and the physical entities may be table space, device file, pages and/or partitions. In order to facilitate the following description, embodiments of the present invention are described by taking the table space as an example of the physical entity.

Figure 4A:
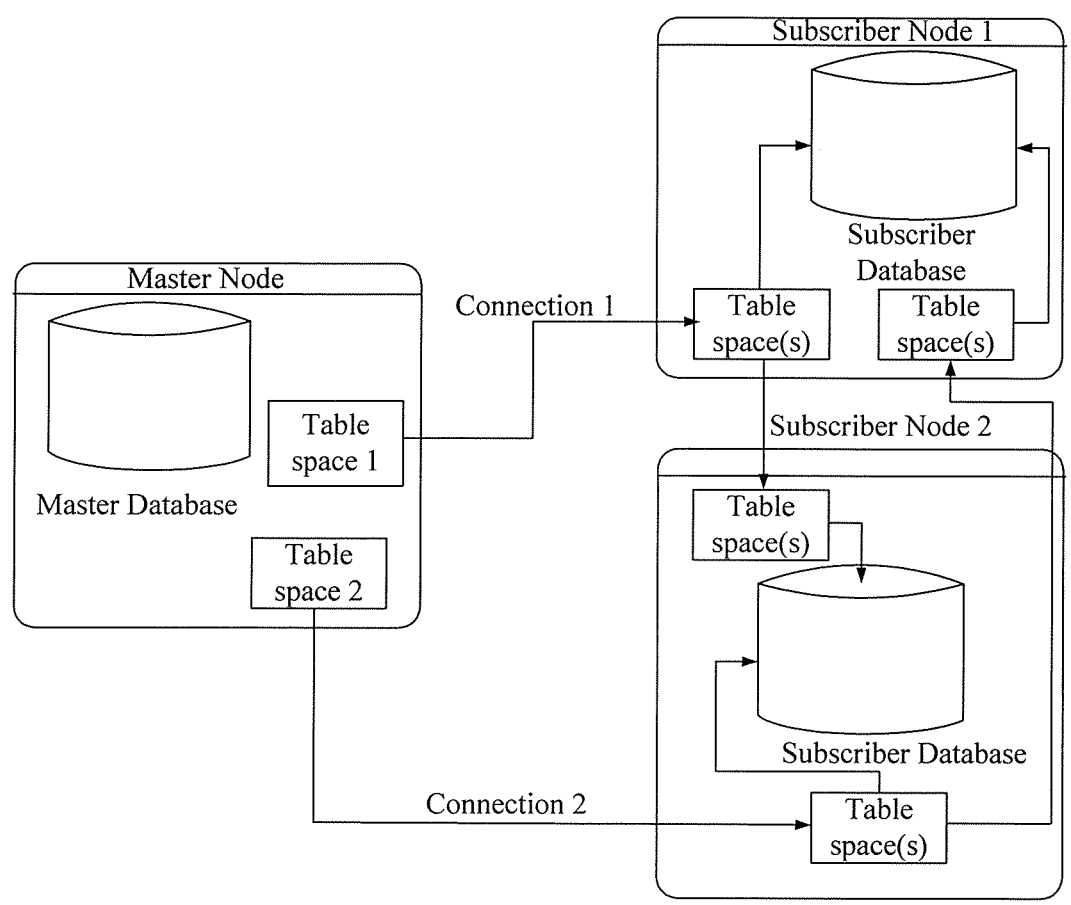
FIG. 4a is an example of a single master replication topology used for implementing a method for peer-to-peer data replication according to an embodiment of the present invention.

FIG. 4a is an example of a single master replication topology used for implementing a method for peer-to-peer data replication according to an embodiment of the present invention. As shown in FIG. 4a, in the single master replication topology, a master node is connected to subscriber node 1 and subscriber node 2, and subscriber node 1 is connected to subscriber node 2, where the master node includes a master database, and the subscriber node 1 includes a subscriber database, and, the subscriber node 2 includes a subscriber database. Besides, the master node is configured to map the two subscriber nodes to two connections. Specifically, the master node maps subscriber node 1 to connection 1, and maps subscriber node 2 to connection 2. Then the master node maps the two connections to two table spaces in the master node. Specifically, the master node maps connection 1 to table space 1, and maps connection 2 to table space 2.

Figure 4B:
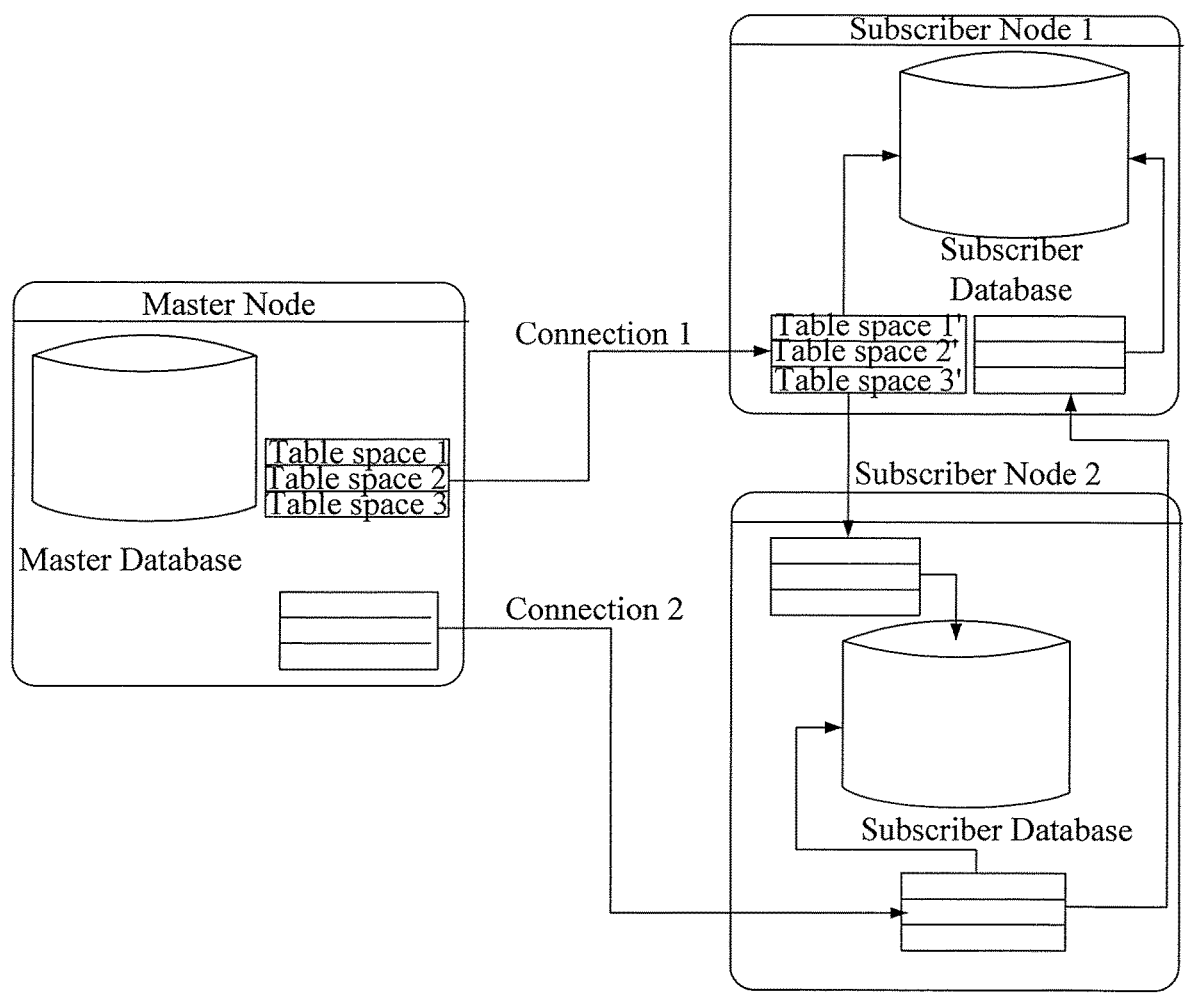
FIG. 4b is another example of a single master replication topology used for implementing a method for peer-to-peer data replication according to an embodiment of the present invention.

FIG. 4b is another example of a single master replication topology used for implementing a method for peer-to-peer data replication according to an embodiment of the present invention. As shown in FIG. 4b, in the single master replication topology, a master node is connected to subscriber node 1 and subscriber node 2, and subscriber node 1 is connected to subscriber node 2, where the master node includes a master database, and the subscriber node 1 includes a subscriber database, and, the subscriber node 2 includes a subscriber database. Besides, the master node is configured to map the two subscriber nodes to two connections, such as connection 1 and connection 2, then the master node maps the two connections to two set of table spaces, in other words, one connection is mapped to one set of table spaces in the master node, the other one connection is mapped to the other one set of table spaces in the master node, where each set of table spaces includes multiple table spaces, such as table space 1, table space 2 and table space 3. In further, the master node may also map the table spaces in each of two sets of table spaces in the master node to any physical entity such as table space, pages, device files, partitions and segments in the related subscriber node. For example, the master node maps subscriber node 1 to the connection 1 between the master node and subscriber node 1, maps the connection 1 between the master node and subscriber node 1 to a first set of table spaces including table space 1, table space 2 and table space 3 in the master node, then maps table space 1 in the master node to table space 1' in subscriber node 1, maps table space 2 in the master node to table space 2' in subscriber node 1, and maps table space 3 in the master node to table space 3' in subscriber node 1.

Figure 4C:
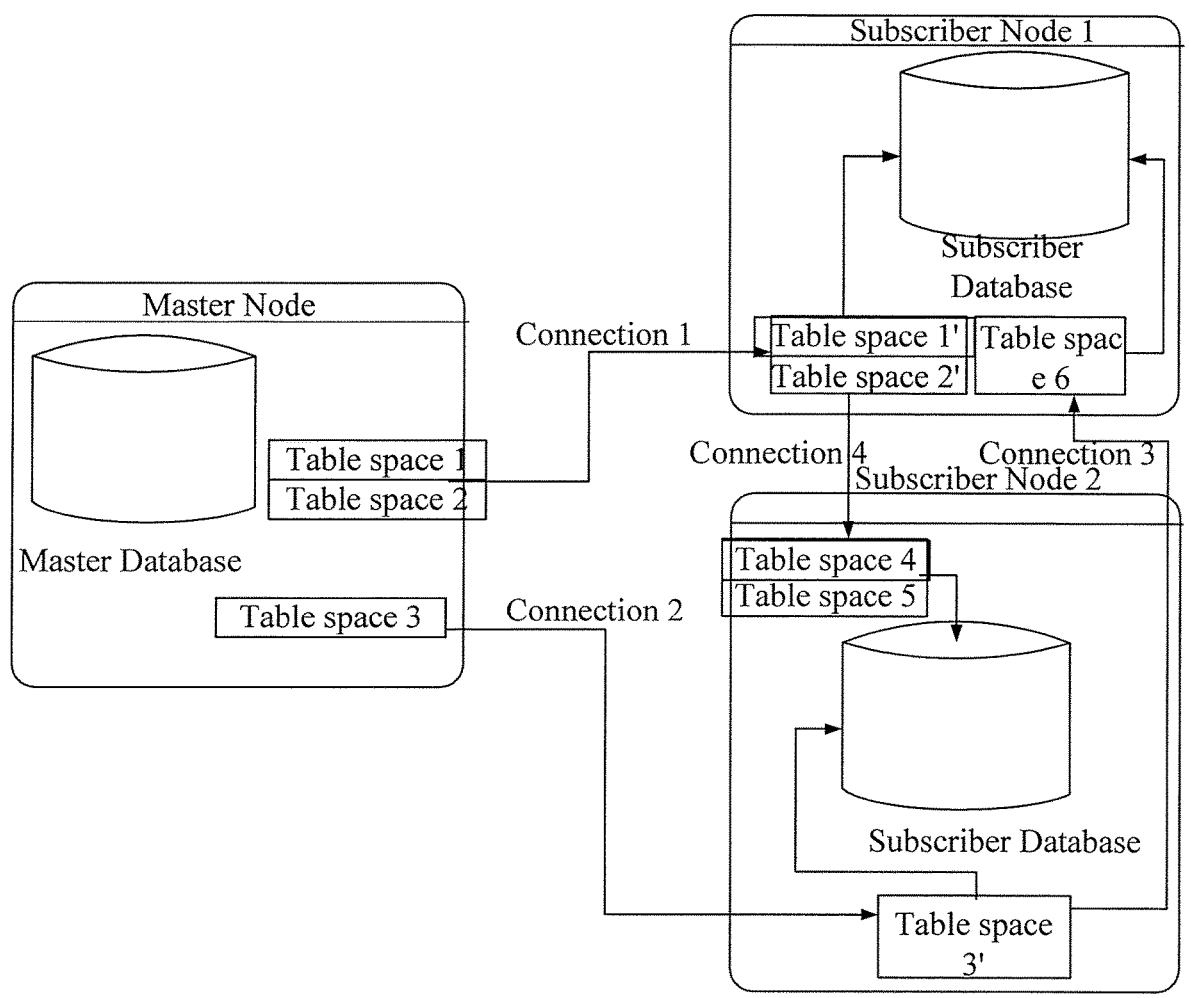
FIG. 4c is another example of a single master replication topology used for implementing a method for peer-to-peer data replication according to an embodiment of the present invention.

FIG. 4c is another example of a single master replication topology used for implementing a method for peer-to-peer data replication according to an embodiment of the present invention. As shown in FIG. 4c, in the single master replication topology, a master node is connected to subscriber node 1 and subscriber node 2, and subscriber node 1 is connected to subscriber node 2, where the master node includes a master database, and the subscriber node 1 includes a subscriber database, and, the subscriber node 2 includes a subscriber database. Besides, the master node is configured to map the two subscriber nodes to two connections, such as connection 1 and connection 2, then the master node maps the two connections to two sets of table spaces in the master node, specifically, the master node maps a first set of table spaces including table space 1 and table space 2 to connection 1 between the master node and subscriber node 1, and maps a second set of table spaces include Table space 3 to connection 2 between the master node and subscriber node 2. In further, in order to realizing data replication between subscriber node 1 and subscriber node 2, the connections 3 and 4 between subscriber node 1 and subscriber node 2 are also needs to be established respectively, where connection 3 is used for replicating data from subscriber node 2 to subscriber node 1, i.e., connection 3 is also mapped to table space 3' in the subscriber node 2, specifically, subscriber node 2 is configured to map subscriber node 1 to connection 3 between the subscriber node 2 and the subscriber node 1, then subscriber node 2 maps the connection 3 to one set of table spaces in the subscriber node 2, specifically, the subscriber node 2 maps table space 3' to connection 3 between the subscriber node 2 and the subscriber node 1, and is specifically used for replicating data from table space 3' (data in which is the same as that in table space 3) to table space 6; connection 4 is used for replicating data from subscriber node 1 to subscriber node 2, i.e., connection 4 is also mapped to table space 1' and table space 2' in the subscriber node 1, specifically, subscriber node 1 is configured to map subscriber node 2 to connection 4 between the subscriber node 1 and the subscriber node 2, then subscriber node 1 maps the connection 4 to one set of table spaces including table space 1' and table space 2' in the subscriber node 1, further the table space 1' in the subscriber node 1 is mapped to table space 4 in the subscriber node 2, and the table space 2' in the subscriber node 1 is mapped to table space 5 in the subscriber node 2, and is specifically used for replicating data from table spaces 1' and 2'(data in which is the same as that in table spaces 1 and 2) to table spaces 4 and 5 respectively.

Figure 5:
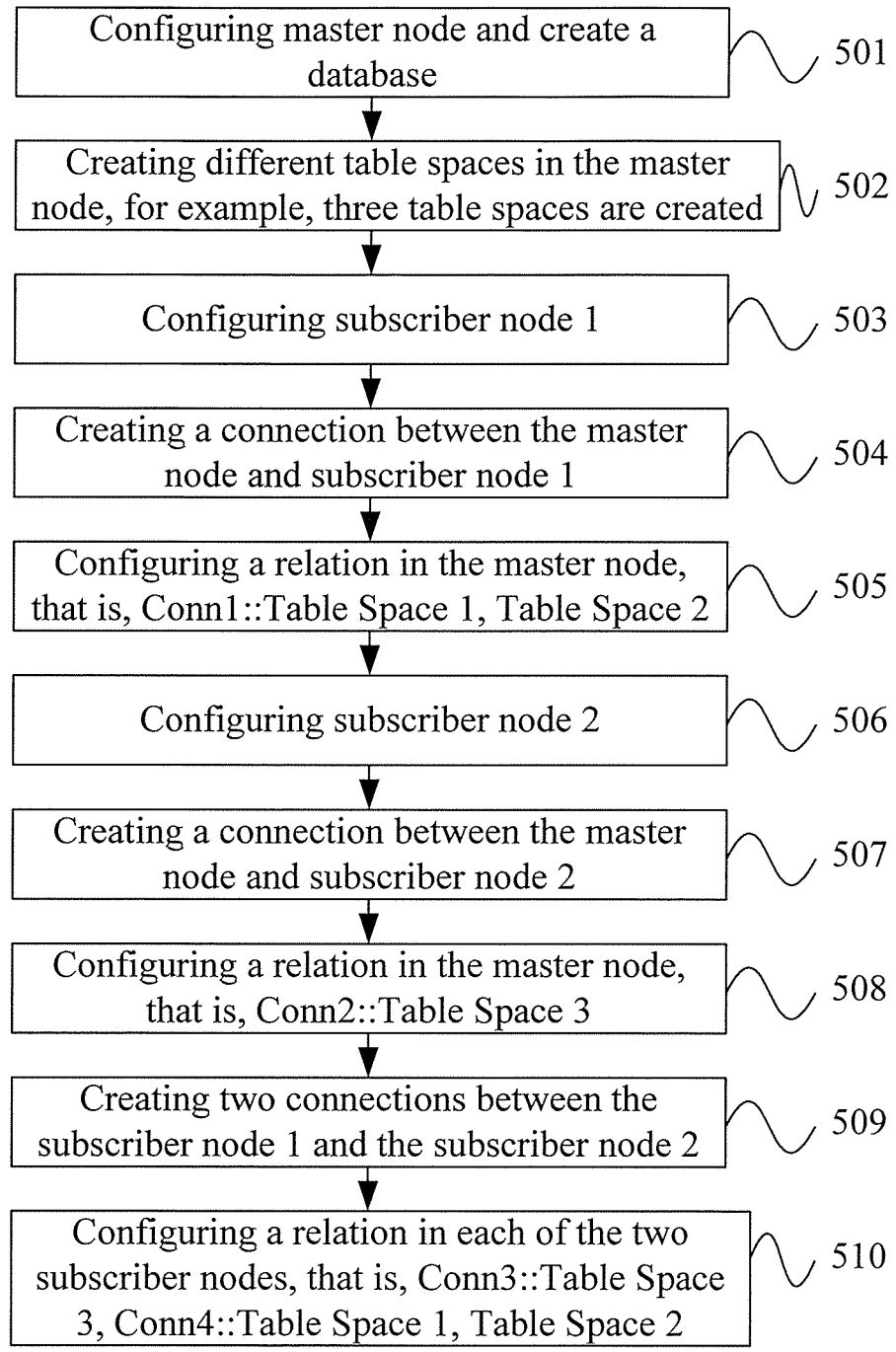
FIG. 5 shows a schematic flow of configuring the single master replication topology as shown in FIG. 4c.

FIG. 5 shows a schematic flow of configuring the single master replication topology as shown in FIG. 4c. As shown in FIG. 5, the flow of configuring the single master replication topology may include:

501. Configuring master node and create a database;

502. Creating different table spaces in the master node, for example, three table spaces are created;

503. Configuring subscriber node 1;

504. Creating a connection between the master node and subscriber node 1, which is referred to as Conn1 in the following; thus, connection 1 is created as shown in FIG. 4c;

505. Configuring a relation in the master node, that is, Conn1::Table Space 1, Table Space 2; thus, connection 1 is mapped to table space 1 and table space 2 as shown in FIG. 4c;

506. Configuring subscriber node 2;

507. Creating a connection between the master node and subscriber node 2, which is referred to as Conn2 in the following; thus, connection 2 is created as shown in FIG. 4c;

508. Configuring a relation in the master node, that is, Conn2::Table Space 3; thus, connection 2 is mapped to table space 3 as shown in FIG. 4c;

509. Creating two connections between the subscriber node 1 and the subscriber node 2, which are referred to as Conn3 and Conn4, respectively, in the following; thus, connection 3 and connection 4 are created as shown in FIG. 4c;

510. Configuring a relation in each of the two subscriber nodes, that is, Conn3::Table Space 3, Conn4::Table Space 1, Table Space 2. Thus, connection 3 is mapped to table space 3, and connection 4 is mapped to table space 1 and table space 2, as shown in FIG. 4c. Therefore, subscriber node 2 can replicate data obtained from table space 3 to subscriber node 1 through connection 3, and subscriber node 1 can replicate data obtained from table space 1 and table space 2 to subscriber node 2 through connection 4.

It should be noted that, there is no specific execution order between steps 503-505 and steps 506-508, for example, steps 506-508 may be performed before steps 503-505, or vise visa.

According to the above procedure, the topology as shown in FIG. 4 is obtained. The following describes the method for peer-to-peer replication provided by embodiments of the present invention by taking the topology as shown in FIG. 4 as an example.

In database parlance a transaction is generally work done between two commits. That is to say, a transaction ends when the DB executes a commit. So, the sequence of a transaction can be maintained by tracking their commits. In the method for peer-to-peer replication provided by embodiments of the present invention, an increasing unique time-based identifier is attached to the commit and is called as commit sequence number (CSN). For example, the CSNs=1, 2, 3, . . . , N, where N is the sequence of the write operation within the master node, that is, when the master node performs the write operation at the first time, the CSN attached to the generated commit redo record is 1, and when the master node performs the write operation at the Nth time, the CSN attached to the generated commit redo record is N. Herein, the write operation may be a data modification operation such as UPDATE, INSERT, and DELETE.

A transaction can generate multiple redo records. Redo records are of multiple types based on the operations, that is, redo records may be "Insert Redo" or "Update Redo" or "Commit Redo". When the transaction is committed, a redo record of type commit will be generated for that transaction. Even though the transactions can be performed on multiple different table spaces, the commit operations are ordered at node level. The Redo record corresponding to the commit operation is called commit redo record and it contains the CSN generated for this commit operation, where the CSN indicates the sequence of the commit operation within this node. Specifically, the CSN, which is global and in the scope of the node, is generated sequentially and is assigned to a commit operation irrespective of the table space on which the transaction is performed. Therefore, by examining the CSN in the commit redo record, the order of the transaction commits will be known. To maintain the data integrity, all the commit redo records are replayed in the same order as their CSN in a node.

Figure 6:
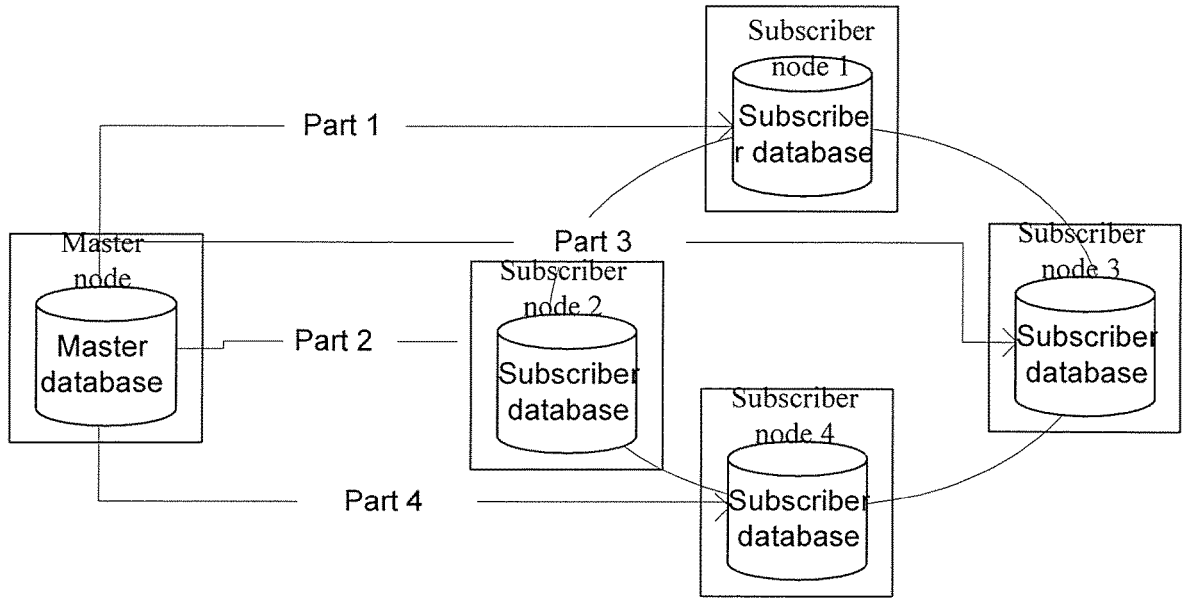
FIG. 6 is another example of a single master replication topology used for implementing a method for peer-to-peer data replication according to an embodiment of the present invention

FIG. 6 is another example of a single master replication topology used for implementing a method for peer-to-peer data replication according to an embodiment of the present invention. As shown in FIG. 6, a master node connects to subscriber node 1, subscriber node 2, subscriber node 3 and subscriber node 4. In the single master replication topology shown in FIG. 6, the master node partitions the commit redo records of the master node into four parts including, for example, part-1 commit redo records, part-2 commit redo records, part-3 commit redo records and part-4 commit redo records, and the master node synchronizes each part of commit redo records with one subscriber node, who in-turn synchronizes with other subscriber nodes. For example, as shown in FIG. 6, the master node synchronizes the part-1 commit redo records with subscriber node 1, synchronizes the part-2 commit redo records with subscriber node 2, synchronizes the part-3 commit redo records with subscriber node 3 and synchronizes the part-4 commit redo records with subscriber node 4, each part of the commit redo records is replayed on different subscriber nodes in parallel, and all of the part-1 commit redo records obtained by subscriber node 1, part-2 commit redo records obtained by subscriber node 2, part-3 commit redo records obtained by subscriber node 3, and part-4 commit redo records obtained by subscriber node 4 are synchronized among the four subscriber nodes. Herein, the partition performed by the master node may be based on the logic of the physical storage of a record, i.e., based on physical entities such as table space, device files, pages and partitions.

Figure 7:
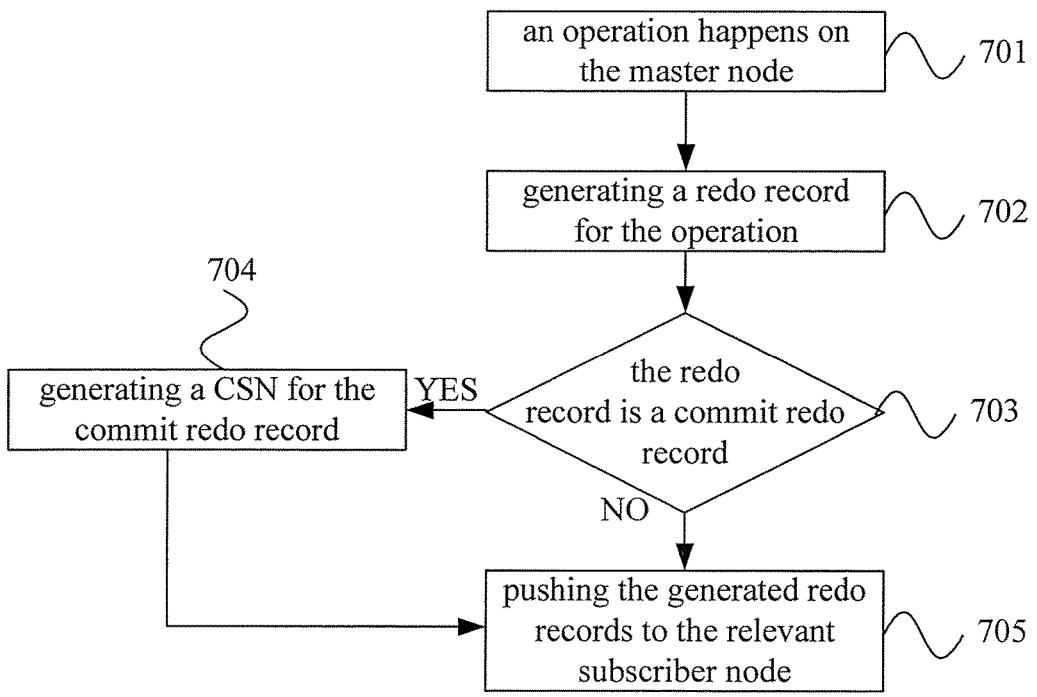
FIG. 7 is a schematic flow of an example of a master node's synchronizing operation according to an embodiment of the present invention.

FIG. 7 is a schematic flow of an example of a master node's synchronizing operation according to an embodiment of the present invention. As shown in FIG. 7, the master node's synchronizing operation includes:

701. An operation happens on the master node;

702. The master node generates redo record for the operation;

703. The master node judges whether the redo record is a commit redo record, if yes, the procedure goes to step 704, and if no, the procedure goes to step 705;

704. The master node generates a CSN for the commit redo record, and then the procedure goes to step 705;

705. The master node pushes the generated redo records to the relevant subscriber node, where the relevant subscriber node is determined by the master node based on the configured mapping relationship.

Taking the mapping relationship created according to FIG. 5 as an example, if a write operation happened on Table Space 1 or Table Space 2, the master node pushes the commit redo record onto Conn1, that is, pushes the commit redo record to subscriber node 1; and if a write operation happened on Table Space 3, the master node pushes the commit redo record onto Conn2, that is, pushes the commit redo record to subscriber node 2.

Figure 8:
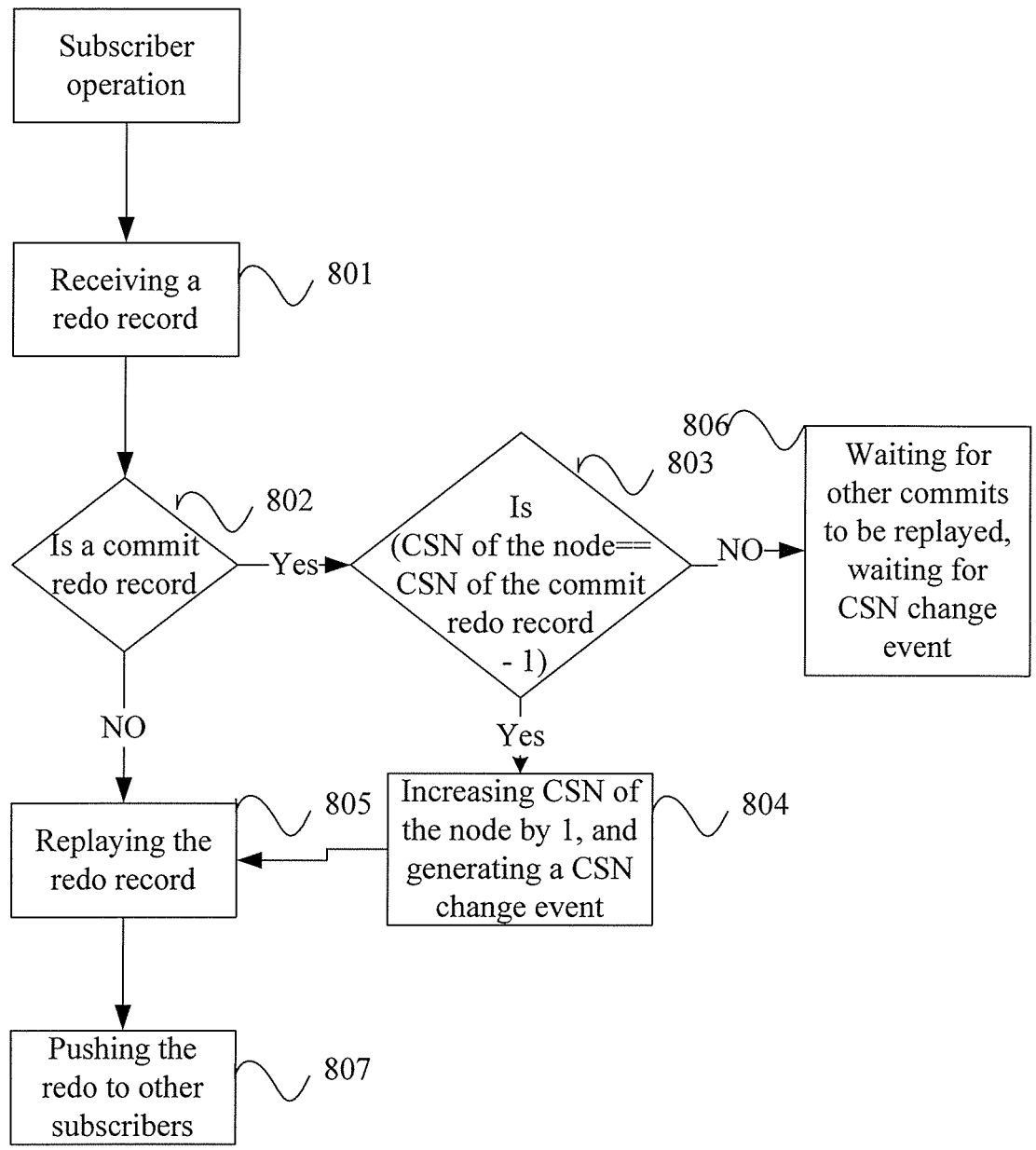
FIG. 8 is a schematic flow of an example of a subscribe node's operation according to an embodiment of the present invention.

After the master node pushes the commit redo record onto the corresponding connections, the subscriber nodes receives the commit redo record and obtains the CSN attached to the commit redo record from the received commit redo record. FIG. 8 is a schematic flow of an example of a subscribe node's operation according to an embodiment of the present invention. As shown in FIG. 8, the subscriber node's synchronizing operation includes:

801. The subscriber node receives a redo record from the master node;

802. The subscriber node judges whether the received redo record is a commit redo record, if yes, the procedure goes to step 803, and if no, the procedure goes to step 706;

803. When the redo record is a commit redo record, the subscriber node checks if a CSN of the subscriber node itself is equal to "CSN obtained from the commit redo record−1", if yes, the procedure goes to step 804, and if no, the procedure goes to step 805;

804. The subscriber node increases the CSN of the subscriber node itself by 1, that is, the updated CSN is the same as the CSN obtained from the commit redo record, and generates a CSN change event; and then the procedure goes to step 806;

805. The subscriber node waits for other commit redo records, and waits for CSN change events;

specifically, when the difference between the CSN of the subscriber node itself and the CSN obtained from the commit redo record is not 1, the subscriber node will not replay the commit redo record and will be waiting for the CSN of the subscriber node itself to become one less than the CSN obtained from the commit redo record. More specifically, the subscriber node waits until it receives all the required commits, where the subscriber node determines the required commits is a very simple way. It is assumed that the subscriber node has received a commit redo record with a CSN 100, and replays this commit redo record and updates the CSN of the subscriber node itself to 100. Now, if the subscriber node receives another commit redo record with a CSN 105, the subscriber node performs the following check to determine if it can replay this commit redo record: "CSN obtained from the commit redo record"−"CSN of the subscriber node"=1. In this example, "CSN obtained from the commit redo record"−"CSN of the subscriber node"=105−100=5, so, the subscriber node can not replay this commit redo record, and needs to wait for commit redo records with CSN 101, 102, 103 and 104 before it can replay the commit redo record with CSN 105. Here, the commit redo records with CSN 101, 102, 103 and 104 are called as the "required commit redo records". The details about replaying a commit redo record after receiving all required commit redo records are illustrated in FIG. 8, which will be described in the following.

806. The subscriber node executes the redo record, that is, the subscriber node replays the redo record; and then the procedure goes to step 807;

807. The subscriber pushes the redo record to other subscribers.

Taking the mapping relationship created according to FIG. 5 as an example, if a write operation happened on Table Space 1 or Table Space 2, the master node pushes the commit redo record onto Conn1, and subscriber node 1 replays the commit redo record, and then pushes the commit redo record to subscriber node 2; and if a write operation happened on Table Space 3, the master node pushes the commit redo record onto Conn2, and subscriber node 2 replays the commit redo record, and then pushes the commit redo record to subscriber node 1.

Figure 9:
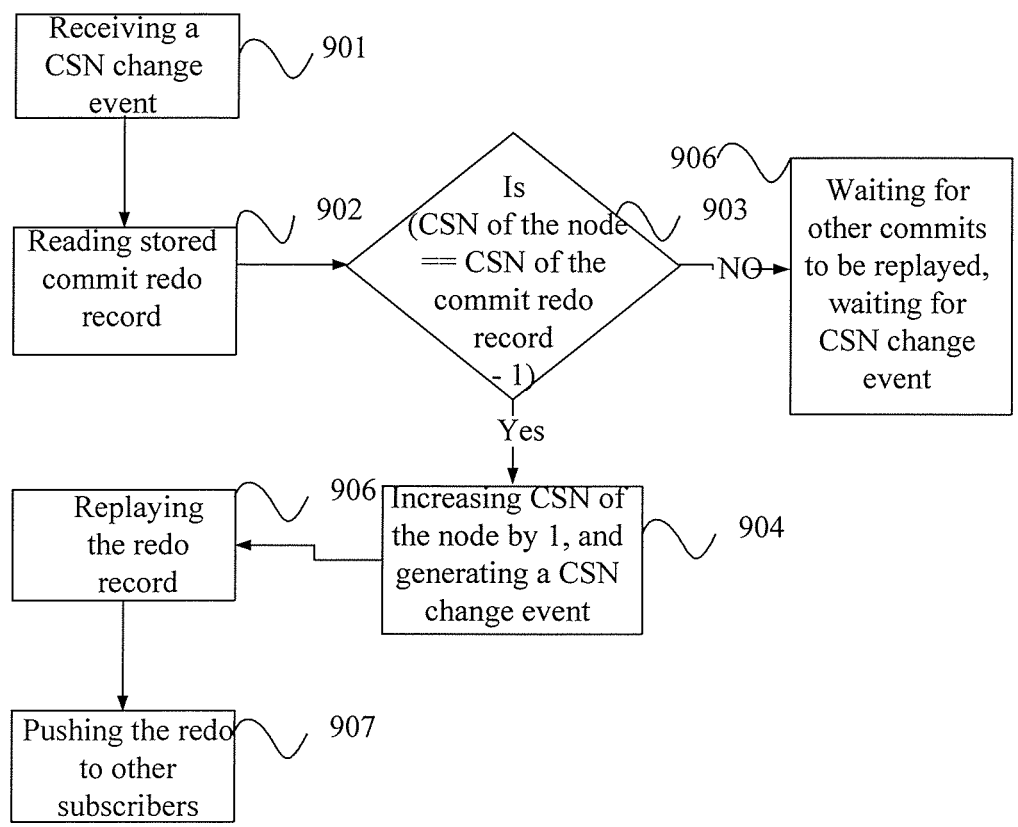
FIG. 9 is a schematic flow of another example of a subscribe node's operation according to an embodiment of the present invention.

FIG. 9 is a schematic flow of another example of a subscriber node's operation according to an embodiment of the present invention. As shown in FIG. 9, the subscriber node's synchronizing operation includes:

901. The subscriber node receives a CSN change event;

902. The subscriber node read stored commit redo record;

903. The subscriber node checks if a CSN of the subscriber node itself is equal to "CSN obtained from the commit redo record−1", if yes, the procedure goes to step 904, and if no, the procedure goes to step 905;

904. The subscriber node increases the CSN of the subscriber node itself by 1, that is, the updated CSN is the same as the CSN obtained from the commit redo record, and generates a CSN change event; and then the procedure goes to step 906;

905. The subscriber node waits for other commit redo records, and waits for CSN change events;

906. The subscriber node executes the redo record, that is, the subscriber node replays the redo record; and then the procedure goes to step 907;

907. The subscriber pushes the redo record to other subscribers.

Taking the mapping relationship created according to FIG. 5 as an example, if a write operation happened on Table Space 1 or Table Space 2, the master node pushes the commit redo record onto Conn1, and subscriber node 1 replays the commit redo record, and then pushes the commit redo record to subscriber node 2; and if a write operation happened on Table Space 3, the master node pushes the commit redo record onto Conn2, and subscriber node 2 replays the commit redo record, and then pushes the commit redo record to subscriber node 1.

According to the method for peer-to-peer data replication provided by embodiments of the present invention, the master node separates the commit redo records generated when write operations happens on the master node into multiple commit redo records, and pushes the multiple commit redo records different subscribers, where each of the multiple commit redo records is pushed by the master node to only one subscriber, and then to other subscriber nodes through pushing by the only one subscriber receiving the commit redo record, thereby reducing the transmission between the master node and the subscriber nodes and, thus, mitigating the replication bottleneck from the master node in a replication cluster.

Figure 1:
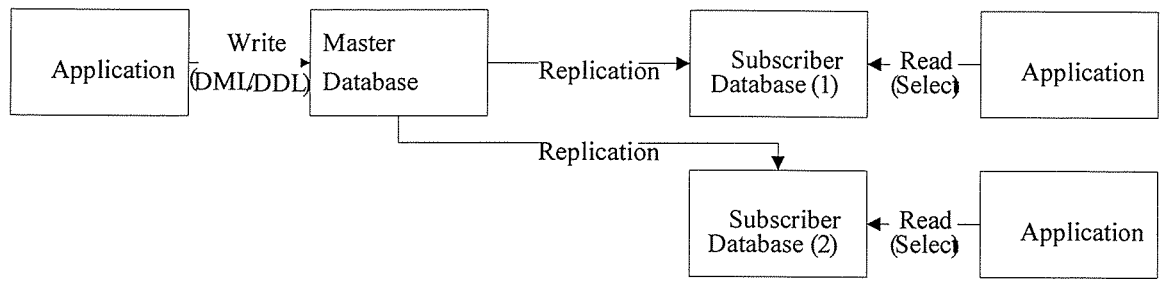
FIG. 1 is a single master replication topology in the prior art.
Figure 2:
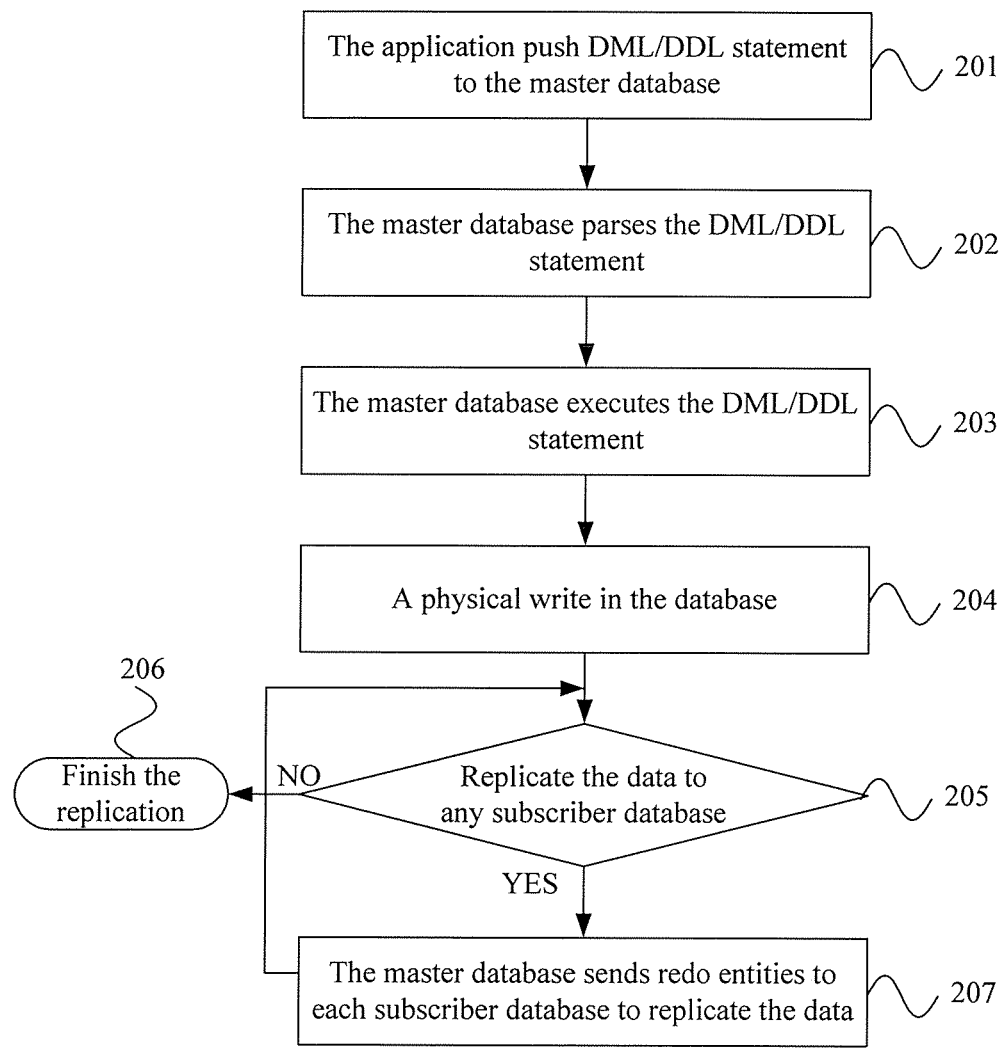
FIG. 2 is a schematic diagram of a conventional implementation of a replication according to the single master replication topology as shown in FIG. 1.
Figure 10:
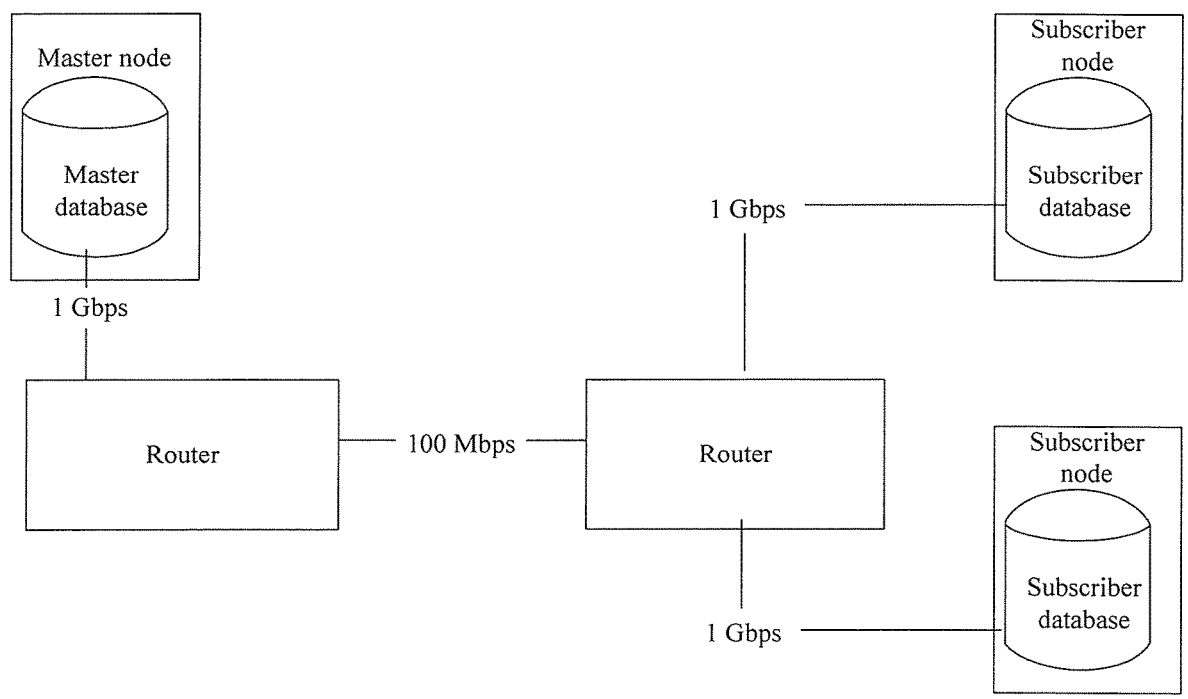
FIG. 10 shows a simple scenario of a P2P network.

Besides, compared with the prior arts as shown in FIG. 1 and FIG. 2, the following beneficial effects and advantages a), b), c), d) and e) can also be achieved by the method for peer-to-peer data replication provided by embodiments of the present invention.

a) On multi-subscriber single master replication, the master's performance improves dramatically. For example, for 2 subscriber cluster, master performance improves by about 50%.

b) In many cases, multi-master solutions can be converted to a deterministic and high performance single master solution. For example, consider a case where a cluster has 20% write-load and 80% read-load. The ideal topology would be 1 write node and 4 read nodes. But practically, because of the overhead of distributing data to 4 subscribers, the master (single write-node) under-utilized almost 50%. This leads to a scenario where we are forced to use multi-master solutions (2 masters and 4 subscribers). But using P2P solution this overhead can be reduced and the solution can remain single-master.

c) Latency on the network reduces, in a simple scenario described in FIG. 10, the latency will be reduced by 50%; specifically, as shown in FIG. 10, the transmission rate between the router at the master node side and the router at the subscriber node side is 100 Mbps, and the transmission rate between two subscriber nodes is 1 Gbps, therefore, compared with the latency caused by the replication between the master node and the subscriber node, the latency caused by the replication between two subscriber nodes can be omitted. According to the method for peer-to-peer data replication provided by embodiments of the present invention, the data of the master should be transmitted to subscriber nodes only once (a part of the data is transmitted to one subscriber node and the remaining part of data is transmitted to the other subscriber node), while the data of the master should be transmitted to subscriber nodes twice according to the method for peer-to-peer data replication in the prior art, thus the latency will be reduced by 50%.

d) The availability of the data increases in a cluster including a master node and multiple subscriber nodes. It is always greater or equal to a single-master serial replication. Also for some critical data multi-level prioritization could be done.

Figure 11:
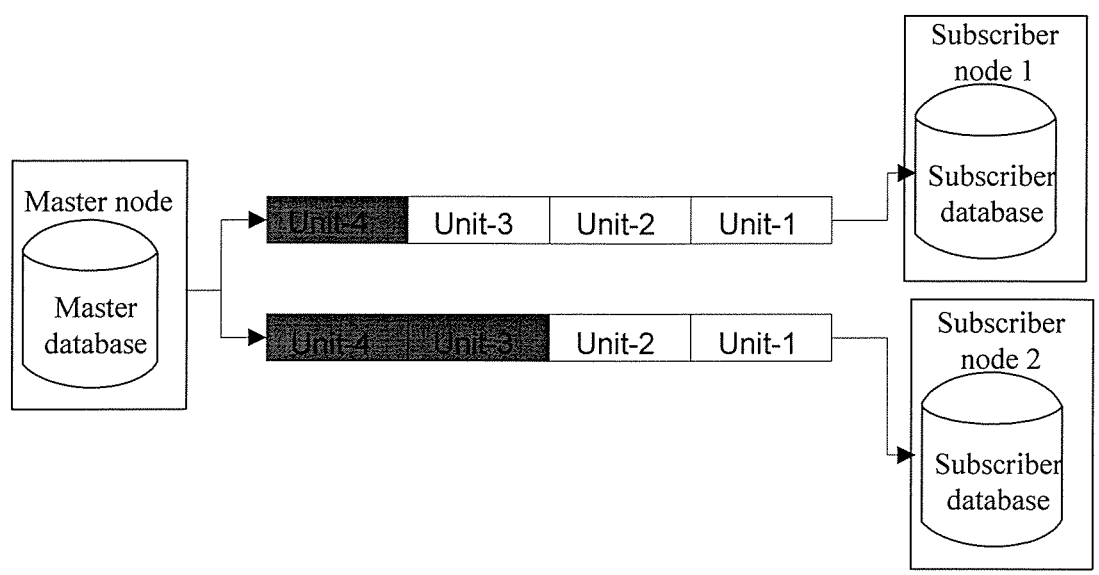
FIG. 11 is a schematic diagram of an example of a data availability issue according to the prior art.

In order to illustrate this beneficial effect more clearly, a specific example is taken as follows. FIG. 11 is a schematic diagram of an example of a data availability issue according to the prior art. In the scenario as shown in FIG. 11, the master node is replicating "4 units of data" to the subscriber node 1 and subscriber node 2. Subscriber node 1 has consumed 3 units of data including Unit-1, Unit-2 and Unit-3, and subscriber node 2 has consumed 2 units of data including Unit-1 and Unit-2. When consider the existence of one copy of data in one node as 100% availability, and if a copy exists in two nodes has 200% so on and so forth, the availabilities for different units of data are: Unit-1's availability=300%, Unit-2's availability=300%, Unit-3's availability=200%, Unit-4's availability=100%. Therefore, if the master node goes down at this point, "Unit-4" is lost. It can be seen that, the prior art suffers from the issue of "data availability". At any given point of time, if the subscriber nodes are lagging with the master node, the lag is always on similar data. Hence in this case the data availability in a cluster including a master node and multiple subscriber nodes is less than 200%.

However, the higher availability of the data in the network can be ensured according to the method for peer-to-peer data replication provided by embodiments of the present invention.

e) The peer-to-peer cluster solution offers ACID properties without the usage of costly Two-Phase commit.

Further, in the method for peer-to-peer data replication according to embodiments of the present invention, when a new subscriber node is added to the cluster, the new subscriber node, the master node and all other relevant subscriber nodes are reconfigured to reflect the situation. After this reconfiguration, the master node starts syncing the transaction logs after the last commit redo result is flushed to the related subscriber nodes.

Further, in the method for peer-to-peer data replication according to embodiments of the present invention, when the master crashes or taken out of network there is a period of time during which the cluster is allowed to resynchronize. As the cluster as a whole contains more data than any individual node, this step is necessary. In order to avoid waiting for ever to complete this synchronization, the time period for the data synchronization amongst peer nodes is pre-configured in the system. The peer node data synchronization during this time period is termed phase-I of the synchronization. Either after the peer node data is synchronized or after the pre-configured time period for the data synchronization amongst peer nodes is out, the phase-I of the synchronization is completed.

Then, elect a subscriber node having the highest CSN to be the master node. Details of electing the master node in different cluster management topologies may be different. For example, there may be two kinds of cluster management topologies. In one kind of topology (which may be termed topology-1), there is a centralized cluster manager node. This centralized cluster manager node has network connections to all other nodes in the cluster. Through these network connections, the cluster manager obtains the CSN of each node, then makes the node with the highest CSN as the master node. In another kind of topology (which may be termed topology-2) there is no centralized cluster manager node, but each data node has information about all other nodes. Hence in this topology all nodes know which node has the highest CSN.

Then the new master node issues a pull request to all the subscriber nodes to enable the subscriber nodes to pushing data to the new master node, thus all data in the cluster can be obtained by the new master node. This time period is termed phase-II of the synchronization. During this period all the subscriber nodes attempt to push their data to the new master node. At the end of phase-II of the synchronization, the new master node and all subscriber nodes which have the same CSN as the master node are operational. Master then reassigns the connection mappings as per configuration and the cluster is operational.

Figure 12:
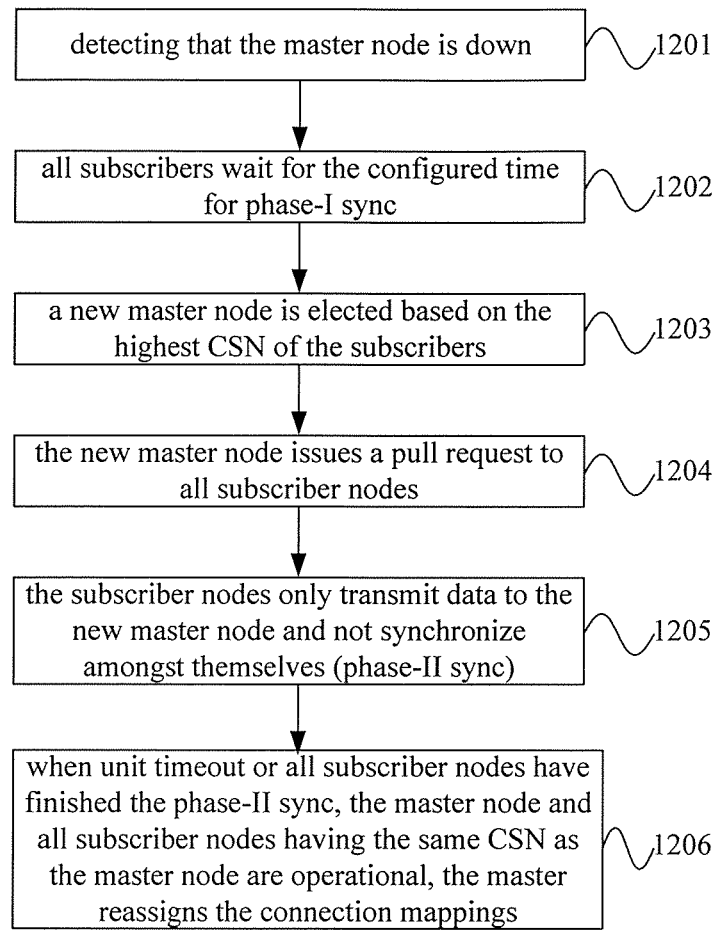
FIG. 12 is a schematic flow of a method for peer-to-peer replication when a master node is down according to an embodiment of the present invention.

Specifically, FIG. 12 is a schematic flow of a method for peer-to-peer replication when a master node is down according to an embodiment of the present invention. As shown in FIG. 12, when the master node is down, the following steps are performed:

1201. all subscriber nodes detect that the master node is down; specifically, the subscriber nodes may detect that the master node is down through many different methods, for example, the subscriber node may detect that the master node is down upon receiving a notification indicating that the master node is down, where the notification may be transmitted by the master node, and may also be transmitted by a device used for monitoring the state of the master node; for another example, the subscriber node may detect that the master node is down when no response message such as a heartbeat response message is received after the subscriber transmits a message such as a heartbeat message;

1202. all subscriber nodes perform data synchronization amongst themselves and wait for the timeout of the pre-configured time period for phase-I of the synchronization;

1203. after the phase-I of the synchronization is completed, the subscriber nodes elect a new master node based on the highest CSN of the subscriber nodes;

1204. the new master node issues a pull request to all subscriber nodes;

1205. the subscriber nodes only transmit data to the new master node and not synchronize amongst themselves (phase-II of the synchronization);

1206. when a pre-configured time period for phase-II of the synchronization is out or all subscriber nodes have finished the phase-II sync, the master node and all subscriber nodes having the same CSN as the master node are operational, the master reassigns the connection mappings.

During all the steps 1201-1206, the cluster including the master node and the subscriber nodes is down, no node can service any client. After step 1206, the cluster including the new master node and all subscriber nodes having the same CSN as the master node recovers and returns to work.

According to the method for peer-to-peer data replication provided by embodiments of the present invention, when the master node is down, the subscriber nodes have ability to create a sync window, thereby making a cluster including the subscriber nodes recover and return to work quickly.

Further, in the method for peer-to-peer data replication according to another embodiment of the present invention, the master node and the subscriber node need not be configured. The master node and the subscriber node can be intelligent to determine the distribution of synchronization amongst themselves.

In the basic implementation, whenever a node (a master node or a subscriber node) is added to the cluster including the master node and multiple subscriber nodes, the master node and the subscriber nodes have to be configured by the user to tell which table space belongs to which node. Similarly, when a table space is added, the user should configure the master node and the subscriber nodes to which node the table space belongs.

In the current embodiment, the master node can be made intelligent to automatically assign a node to table space when a new table space is created. This could be done by any of the strategies, for which a few examples are given here.

1. In a round robin manner. The master node keeps a count of the number of table spaces attached to each subscriber node, then assigns the new table space based on this count.

2. In a load balanced manner. The master node keeps track of the redo traffic flowing to each subscriber node. Based on this, the master node chooses the least loaded subscriber node and assigns the table space to this subscriber node.

Similarly, when a new subscriber node is added to the cluster, the master node can automatically move the ownership of a few table spaces to this new subscriber node. The master node can use any policy, for which a few examples are given here.

1. Move an equal number table spaces from each existing subscriber node, so that after the table space assignment, each subscriber node roughly has the same amount of table space ownership.

2. Move table space ownership from replication subscriber nodes which are closest to the new subscriber node, where the subscriber nodes which are closest to the new subscriber node can be determined easily by using network data packet hop statistics based on trace route.

According to the method for peer-to-peer data replication provided by embodiments of the present invention, on addition of a new node, the master node has the elasticity to assign a physical entity and start replicating to this physical entity.

Figure 13:
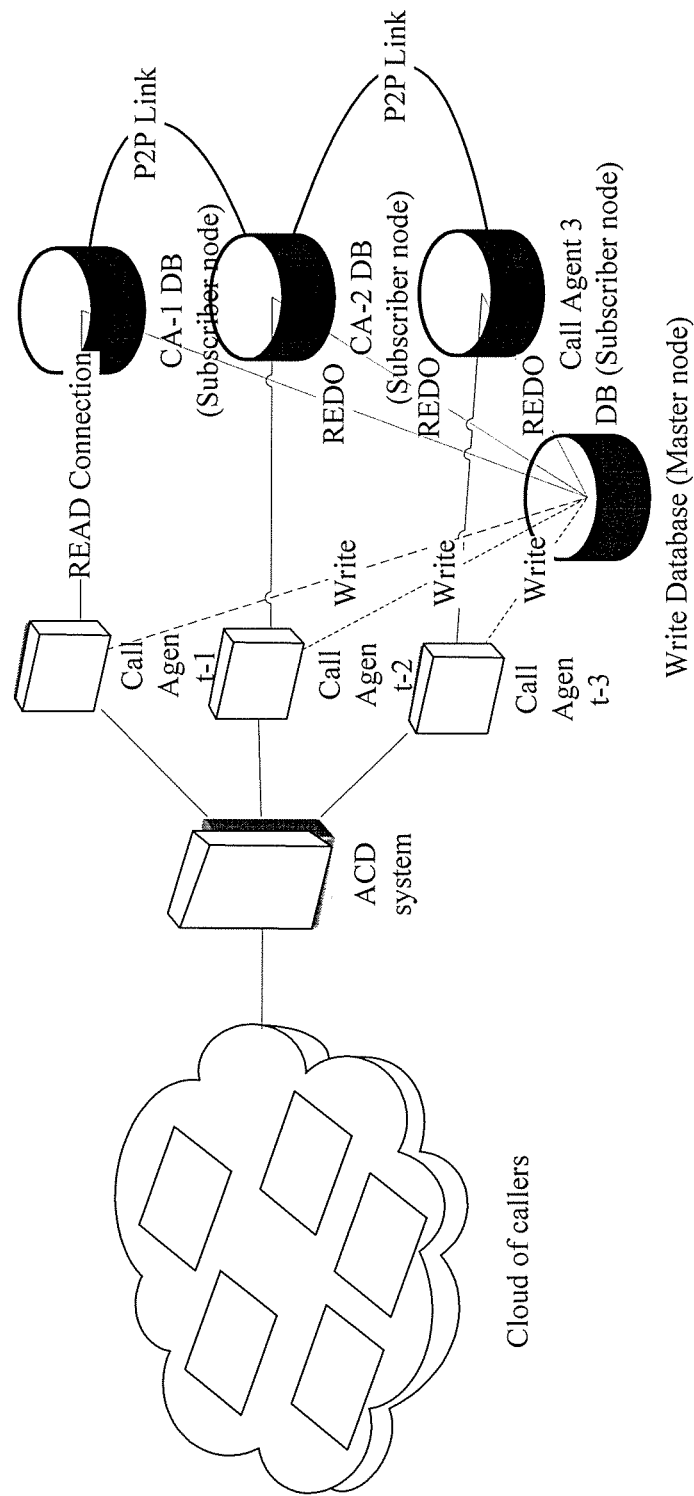
FIG. 13 is a schematic structural diagram of an example of a scenario to which a method for peer-to-peer data replication according to an embodiment of the present invention is applicable.

The method for peer-to-peer data replication according to embodiments of the present invention is applicable to any scenario including one or more master node and subscriber nodes. FIG. 13 is a schematic structural diagram of an example of a scenario to which a method for peer-to-peer data replication according to an embodiment of the present invention is applicable. As shown in FIG. 13, in this scenario for a call-center solution, an automatic call distribution (ACD) system distributes the calls to various call agents. Generally, call agents refer to a subscriber database to engage their calls. For the best performance, it is required that a call-agent be associated with one copy of the subscriber database. Sometimes the call agents need to write into the subscriber database also, and this write operation needs to be replicated to all subscriber databases. As shown in FIG. 13, a single-master cluster may be used in this scenario, that is, when the call agent needs to write into the subscriber database, the call agent write in to the master node connecting with all subscriber nodes, and then the write operation happened on the master node can be replicated to the subscriber nodes according to the method for peer-to-peer data replication provided by embodiments of the present invention. Therefore, compared with the prior art, if a multi-master cluster was used, the performance of the whole cluster is decreased, if a single-master cluster is used, the single-master will be overloaded and the latency of the cluster increases because of multiple times of data replication for different subscriber nodes. However, the method for peer-to-peer data replication according to embodiments of the present invention fits well into this scenario.

Figure 14:
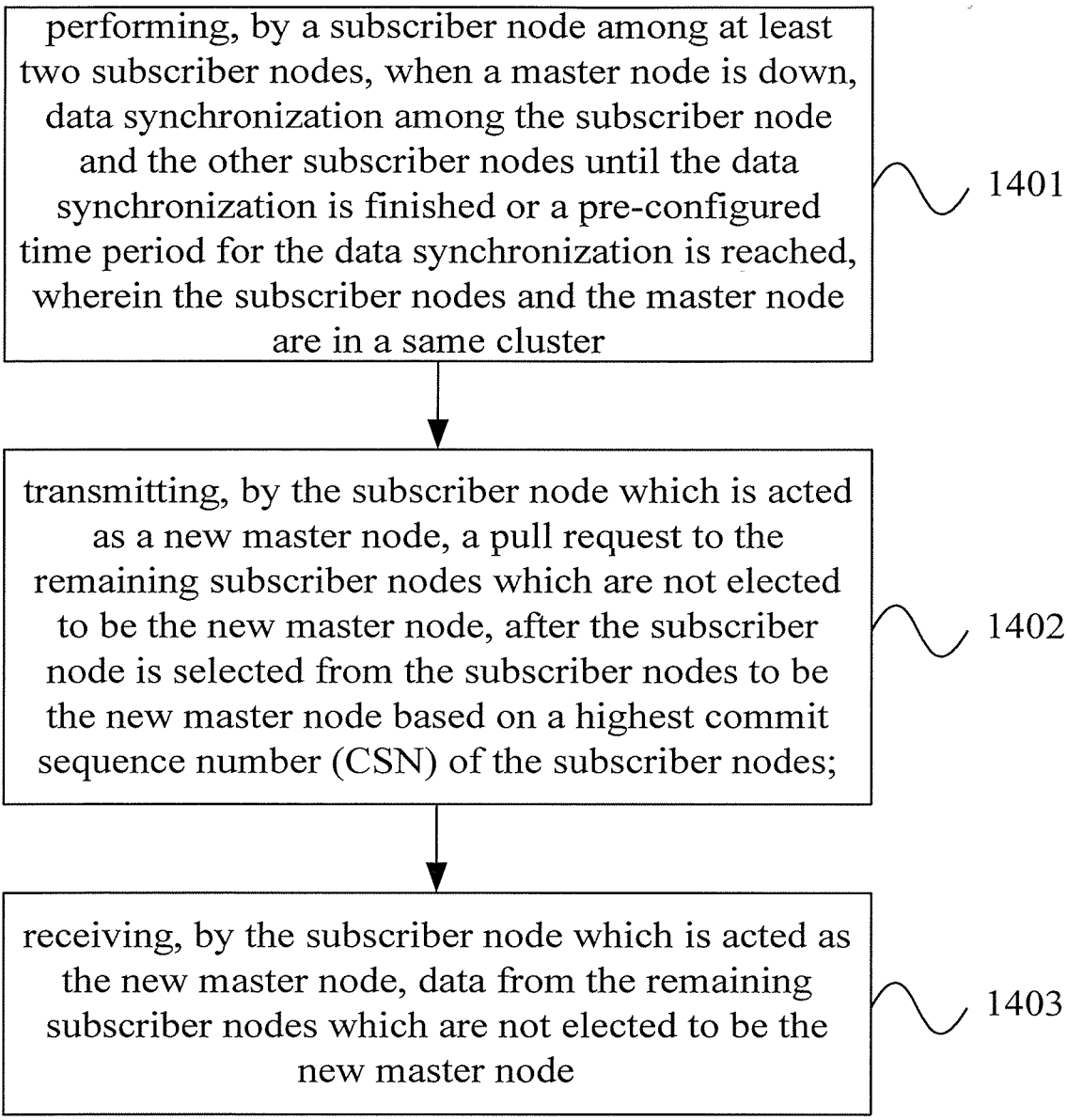
FIG. 14 is a schematic flow of a method for master node switching according to an embodiment of the present invention.

In further, embodiments of the present invention provide a method for master node switching. FIG. 14 is a schematic flow of a method for master node switching according to an embodiment of the present invention. As shown in FIG. 14, the method includes the following steps.

1401. A subscriber node among at least two subscriber nodes performs, when a master node is down, data synchronization among the subscriber node and the other subscriber nodes until the data synchronization is finished or a pre-configured time period for the data synchronization is out, where the subscriber nodes and the master node are in a same cluster;

1402. The subscriber nodes which is acted as a new master node transmits a pull request to the remaining subscriber nodes which are not elected to be the new master node, after the subscriber node is selected from the subscriber nodes to be the new master node based on a highest commit sequence number (CSN) of the subscriber nodes;

1403. The subscriber nodes which is acted as a new master node receives data from the remaining subscriber nodes which are not elected to be the new master node.

Details of the above method for master node switching please refer to the method for peer-to-peer replication when a master node is down as shown in FIG. 12, which will not be repeated herein.

Further, the above method for master node switching also including: establishing, by the subscriber node which is acted as the new master node, mapping relationships between physical entities in the new master node and the other subscriber nodes other than the subscriber node; and performing, by the subscriber node which is acted as the new master node, peer-to-peer data replication between the new master node and the other subscriber nodes which are not elected to be the new master node according to the mapping relationships, when a write operation happens on the physical entity in the new master node.

Herein, the new master mode may perform the peer-to-peer data replication according to the method for peer-to-peer data replication provided by embodiments of the present invention.

According to the above method for master node switching provided by embodiments of the present invention, when the master node is down, the subscriber nodes have ability to create a sync window, thereby making a cluster including the subscriber nodes recover and return to work quickly.

Figure 15:
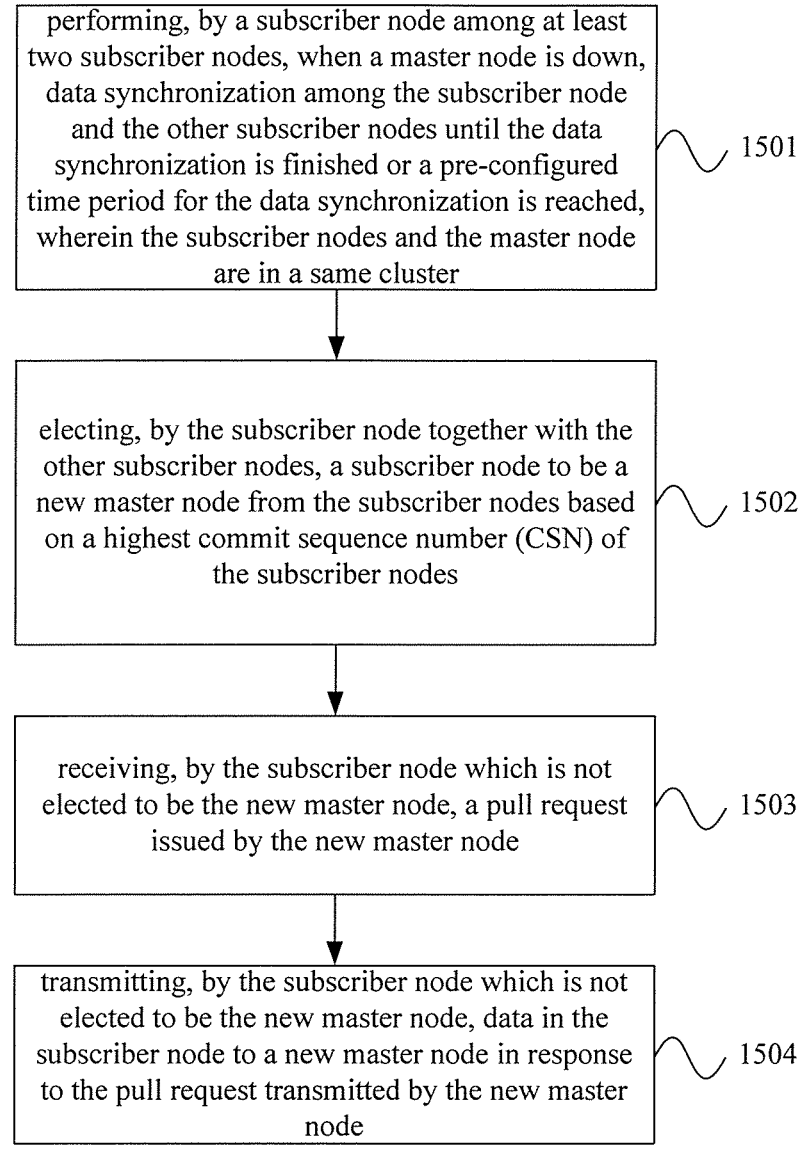
FIG. 15 is a schematic flow of another method for master node switching according to an embodiment of the present invention.

FIG. 15 is a schematic flow of a method for master node switching according to another embodiment of the present invention. As shown in FIG. 15, the method includes the following steps.

1501. A subscriber node among at least two subscriber nodes performs, when a master node is down, data synchronization among the subscriber node and the other subscriber nodes until the data synchronization is finished or a preconfigured time period for the data synchronization is reached, where the subscriber nodes and the master node are in a same cluster;

1502. The subscriber node together with the other subscriber nodes elect, a subscriber node to be a new master node from the subscriber nodes based on a highest CSN of the subscriber nodes;

1503. The subscriber node which is not elected to be the new master node receives a pull request issued by the new master node;

1504. The subscriber node which is not elected to be the new master node transmits data in the subscriber node to a new master node in response to the pull request transmitted by the new master node.

According to the above method for master node switching provided by embodiments of the present invention, when the master node is down, the subscriber nodes have ability to create a sync window, thereby making a cluster including the subscriber nodes recover and return to work quickly.

By the embodiments described above, persons skilled in the art may clearly understand that the present invention may be implemented by software with necessary common hardware. Specifically, the present invention may also be implemented by only hardware. However, the former is the preferred implementation mode. Based on such understanding, the essence of the technical solution of the present invention or the part of that makes a contribution to the prior art may be implemented in the form of software product. The computer software product is stored in a readable storage medium such as a computer floppy disk, a hard disk, or an optical disk, and includes multiple instructions to enable computer equipment (which may be a personal computer, a server, or network equipment) to execute the method described in embodiments of the present invention.

Figure 16:
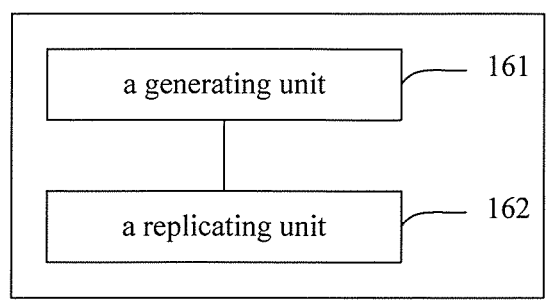
FIG. 16 is a schematic structure diagram of a device for peer-to-peer data replication according to an embodiment of the present invention.

FIG. 16 is a schematic structure diagram of a device for peer-to-peer data replication according to an embodiment of the present invention. The device for peer-to-peer data replication shown in FIG. 16 may be positioned on a master node. As shown in FIG. 16, device for peer-to-peer data replication includes:

a generating unit 161, configured to generate a first commit redo record attached with a commit sequence number (CSN), when a first write operation happens on a first physical entity in the master node, where the master node is preset with at least two physical entities including the first physical entity and a second physical entity and the master node is connected to at least two subscriber nodes including a first subscriber node and a second subscriber node, where the CSN attached in the first commit redo record is used for indicating the sequence of the first write operation within the master node; and a replicating unit 162, configured to push the first commit redo record attached with the CSN to a first subscriber node corresponding to the first physical entity based on mapping relationships between the physical entities and the subscriber nodes, where the first commit redo record is used for replicating data of the first write operation from the master node to the first subscriber node corresponding to the first physical entity, and then to the second subscriber node through pushing, by the first subscriber node, the received first commit redo record, to the second subscriber node.

The details of performing peer-to-peer data replication by the device for peer-to-peer data replication according to embodiments of the present invention please refer to the above method embodiments, which will not be repeated here.

According to the device for peer-to-peer data replication provided by embodiments of the present invention, the master node separates the commit redo records generated when write operations happens on the master node into multiple commit redo records, and pushes the multiple commit redo records different subscribers, where each of the multiple commit redo records is pushed by the master node to only one subscriber, and then to other subscriber nodes through pushing by the only one subscriber receiving the commit redo record, thereby reducing the transmission between the master node and the subscriber nodes and, thus, mitigating the replication bottleneck from the master node in a replication cluster.

Figure 17:
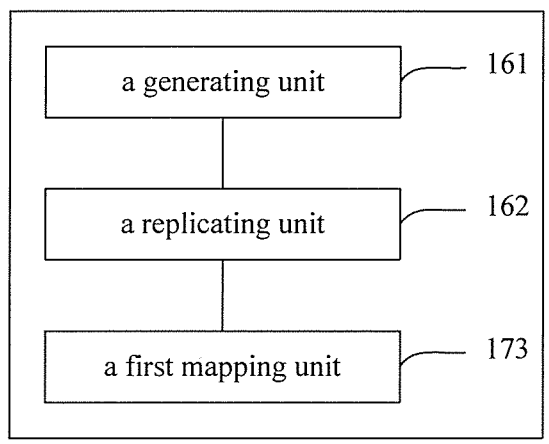
FIG. 17 is a schematic structure diagram of a device for peer-to-peer data replication according to another embodiment of the present invention.

FIG. 17 is a schematic structure diagram of a device for peer-to-peer data replication according to another embodiment of the present invention. As shown in FIG. 17, the device for peer-to-peer data replication may further includes:

a first mapping unit 173, configured to establish the mapping relationships between the physical entities and the subscriber nodes by mapping different subscriber nodes to different connections between the master node and the subscriber nodes, and by mapping different connections to different sets of physical entities, where each set of physical entities includes one or multiple physical entities.

Correspondingly, the replicating unit 162 is specifically configured to push the first commit redo record attached with the CSN to the first subscriber node corresponding to the first physical entity based on the mapping relationship between the first physical entity and the first subscriber node through the connection between the master node and the first subscriber node.

According to the device for peer-to-peer data replication provided by embodiments of the present invention, the mapping relationships between the physical entities and the subscriber nodes can be established conveniently, and thus the performance of the master node can be improved in further.

Figure 18:
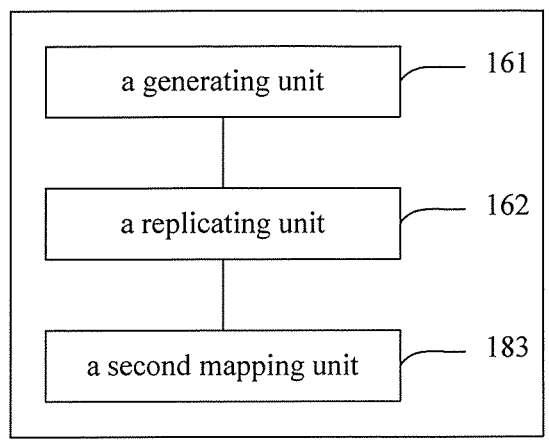
FIG. 18 is a schematic structure diagram of a device for peer-to-peer data replication according to another embodiment of the present invention.

FIG. 18 is a schematic structure diagram of a device for peer-to-peer data replication according to another embodiment of the present invention. As shown in FIG. 18, the device for peer-to-peer data replication may further includes:

a second mapping unit 183, configured to establish the mapping relationships between the physical entities and the subscriber nodes by mapping different subscriber nodes to different connections between the master node and the subscriber nodes, and by mapping different connections to different sets of physical entities in the master node, where each set of physical entities in the master node includes multiple physical entities, and further by mapping different physical entities in one set of physical entities in the master node to different physical entities in the subscriber node corresponding to the set of physical entities.

Correspondingly, the replicating unit 162 is specifically configured to push the first commit redo record attached with the CSN to a third physical entity corresponding to the first physical entity, where the first subscriber node is preset with at least two physical entities including the third physical entity and a fourth physical entity, based on the mapping relationship between the set of physical entities to which the first physical entity belongs and that is of the master node and the first subscriber node and the mapping relationship between the first physical entity and the third physical entity, through the connection between the master node and the first subscriber node.

According to the device for peer-to-peer data replication provided by embodiments of the present invention, not only the mapping relationships between the physical entities in the master node and the subscriber nodes can be established, but also the mapping relationships between the physical entities in the master node and the physical entities in the subscriber nodes can be established, therefore, the master node can know the data distribution among different physical entities in the subscriber node, thereby realizing the load balance among physical entities within each subscriber node.

In further, in the device for peer-to-peer data replication provided by embodiments of the present invention, the replicating unit is further configured to, when a new subscriber node is connected to the master node, synchronize commit redo records to the new subscriber node after physical entities in the master node and mapping relationships between the physical entities and the subscriber nodes including the new subscriber node are reconfigured.

According to the device for peer-to-peer data replication provided by embodiments of the present invention, the single master replication topology can be extended conveniently.

In further, in the device for peer-to-peer data replication provided by embodiments of the present invention, the first commit record is separated from a second commit record, which is generated by the device when a second write operation happens on a second physical entity, based on physical entities on which the related write operation happens. Herein, the physical entities may be table space, device files, pages and/or partitions.

The first commit record and the second commit record are pushed, in parallel, by the replicating unit, to the first subscriber node and the second subscriber node, respectively, so that the first commit record and the second commit record are replayed, in parallel, by the first subscriber node and the second subscriber node, respectively; where, the second commit redo record is used for replicating data of the second write operation from the master node to the second subscriber node corresponding to the second physical entity, and then to the first subscriber node through pushing, by the second subscriber node, the received second commit redo record, to the first subscriber node.

According to the device for peer-to-peer data replication provided by embodiments of the present invention, the data of the master node can be separated and transmitted to different subscriber nodes easily and conveniently, thus the performance of the master node can be improved in further.

Figure 19:
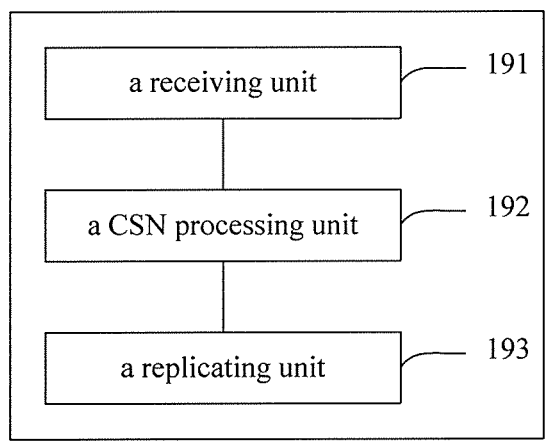
FIG. 19 is a schematic structure diagram of a device for peer-to-peer data replication according to another embodiment of the present invention.

FIG. 19 is a schematic structure diagram of a device for peer-to-peer data replication according to another embodiment of the present invention. The device for peer-to-peer data replication shown in FIG. 19 may be positioned on a subscriber node. As shown in FIG. 19, device for peer-to-peer data replication includes:

a receiving unit 191, configured to receive a commit redo record attached with a CSN from a master node, where the CSN attached in the commit redo record is used for indicating the sequence of a write operation within the master node;

a CSN processing unit 192, configured to update a CSN of the subscriber node to the CSN attached to the commit redo record, when an absolute value of the CSN attached to the commit redo record minus the CSN of the subscriber node is 1, where the CSN of the subscriber node is set to 0 during an initialization; and a replicating unit 193, configured to replay the commit redo record to replicate data of a write operation happened on a master node from the master node to the subscriber node, where the subscriber node is connected to the master node and other subscriber nodes connected to the master node; and push the commit redo record to the other subscriber nodes, to replicate the data of the write operation happened on the master node to the other subscribers.

The details of performing peer-to-peer data replication by the device for peer-to-peer data replication according to embodiments of the present invention please refer to the above method embodiments, which will not be repeated here.

According to the device for peer-to-peer data replication provided by embodiments of the present invention, the transmission between the master node and the subscriber nodes is reduced and, thus, the replication bottleneck from the master node in a replication cluster is mitigated.

Further, in the device for peer-to-peer data replication provided by embodiments of the present invention, the CSN processing unit is further configured to save the received commit redo record and wait for another commit redo record, when the absolute value of the CSN attached to the received commit redo record minus the CSN of the subscriber node is not 1; and the replicating unit is further configured to replay the commit redo record to replicate data of the write operation happened on the master node from the master node to the subscriber node, after the CSN of the subscriber node is updated to a value that the absolute value of the CSN attached to the received commit redo record minus the updated CSN of the subscriber node is 1.

According to the device for peer-to-peer data replication provided by embodiments of the present invention, even the commit redo records received by the subscriber node are out of order, the correct replication can be guaranteed.

Figure 20:
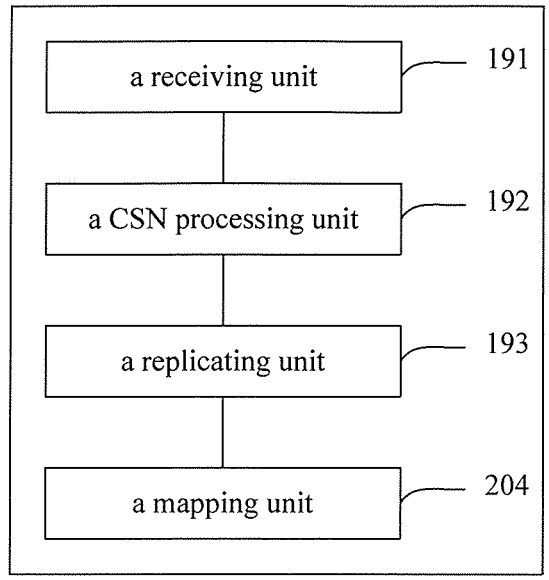
FIG. 20 is a schematic structure diagram of a device for peer-to-peer data replication according to another embodiment of the present invention.

Further, FIG. 20 is a schematic structure diagram of a device for peer-to-peer data replication according to another embodiment of the present invention. In the device for peer-to-peer data replication shown in FIG. 20, the replicating unit 193 is further configured to transmit a pull request to all other subscriber nodes to get all data of the write operation happened on the master node, which is obtained by replaying the commit redo record, in the other subscriber nodes after the master node is down and the subscriber node is elected to be a new master node; and the device further includes a mapping unit 204, configured to, when the subscriber node is acted as the new master node, reassign mapping relationships between physical entities in the new master node and the other subscriber nodes other than the subscriber node which is act as the new master node.

Optionally, the replicating unit 193 is further configured to transmit the data of the write operation happened on the former master node in the subscriber node to a subscriber node which is acted as a new master node in response to a pull request transmitted by the new master node, after the former master node is down and another subscriber node is elected to be the new master node.

According to the device for peer-to-peer data replication provided by embodiments of the present invention, when the master node is down, the subscriber nodes have ability to make a cluster including the subscriber nodes recover and return to work quickly.

Figure 21:
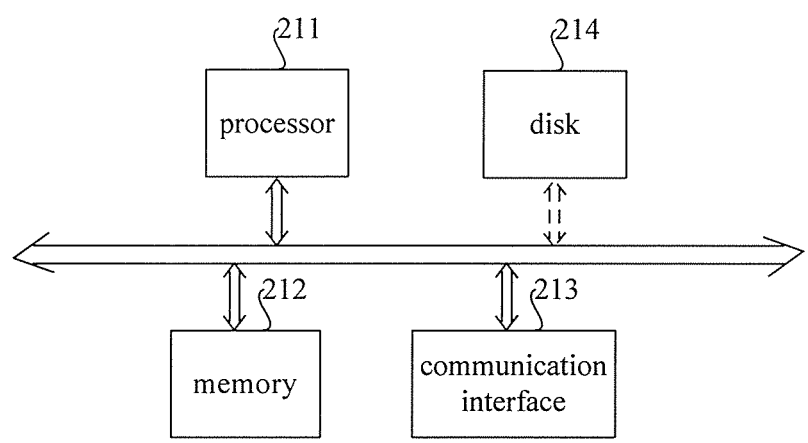
FIG. 21 is a schematic structure diagram of a device for peer-to-peer data replication according to another embodiment of the present invention.

FIG. 21 is a schematic structure diagram of a device for peer-to-peer data replication according to another embodiment of the present invention. The device for peer-to-peer data replication shown in FIG. 21 may be positioned on a master node. As shown in FIG. 21, device for peer-to-peer data replication includes a processor 211 and a memory 212 coupled to the processor 211.

The memory 211 is configured to store program. Specifically, the program may include program code, and the program code may include computer operating instruction.

The processor 211 is configured to: generate a first commit redo record attached with a commit sequence number (CSN), when a first write operation happens on a first physical entity in the master node, where the master node is preset with at least two physical entities including the first physical entity and a second physical entity and the master node is connected to at least two subscriber nodes including a first subscriber node and a second subscriber node, where the CSN attached in the first commit redo record is used for indicating the sequence of the first write operation within the master node; and push the first commit redo record attached with the CSN to a first subscriber node corresponding to the first physical entity based on mapping relationships between the physical entities and the subscriber nodes, where the first commit redo record is used for replicating data of the first write operation from the master node to the first subscriber node corresponding to the first physical entity, and then to the second subscriber node through pushing, by the first subscriber node, the received first commit redo record, to the second subscriber node.

The memory 212 may include a high speed RAM and a non-volatile memory.

The processor 211 may be a Central Processing Unit (CPU), or can be Application Specific Integrated Circuit (ASIC), or can be configured to one or more ASIC.

The details of performing peer-to-peer data replication by the device for peer-to-peer data replication according to embodiments of the present invention please refer to the above method embodiments, which will not be repeated here.

According to the device for peer-to-peer data replication provided by embodiments of the present invention, the master node separates the commit redo records generated when write operations happens on the master node into multiple commit redo records, and pushes the multiple commit redo records different subscribers, where each of the multiple commit redo records is pushed by the master node to only one subscriber, and then to other subscriber nodes through pushing by the only one subscriber receiving the commit redo record, thereby reducing the transmission between the master node and the subscriber nodes and, thus, mitigating the replication bottleneck from the master node in a replication cluster.

Specifically, in the above device for peer-to-peer data replication, the physical entities are table space, device files, pages and/or partitions.

In further, the processor is further configured to: establish the mapping relationships between the physical entities and the subscriber nodes by mapping different subscriber nodes to different connections between the master node and the subscriber nodes, and by mapping different connections to different sets of physical entities, where each set of physical entities includes one or multiple physical entities; and push the first commit redo record attached with the CSN to the first subscriber node corresponding to the first physical entity based on the mapping relationship between the first physical entity and the first subscriber node through the connection between the master node and the first subscriber node.

According to the device for peer-to-peer data replication provided by embodiments of the present invention, the mapping relationships between the physical entities and the subscriber nodes can be established conveniently, and thus the performance of the master node can be improved in further.

In further, the processor is further configured to: establish the mapping relationships between the physical entities and the subscriber nodes by mapping different subscriber nodes to different connections between the master node and the subscriber nodes, and by mapping different connections to different sets of physical entities in the master node, where each set of physical entities in the master node includes multiple physical entities, and further by mapping different physical entities in one set of physical entities in the master node to different physical entities in the subscriber node corresponding to the set of physical entities; and push the first commit redo record attached with the CSN to a third physical entity corresponding to the first physical entity, where the first subscriber node is preset with at least two physical entities including the third physical entity and a fourth physical entity, based on the mapping relationship between the set of physical entities to which the first physical entity belongs and that is of the master node and the first subscriber node and the mapping relationship between the first physical entity and the third physical entity, through the connection between the master node and the first subscriber node.

According to the device for peer-to-peer data replication provided by embodiments of the present invention, not only the mapping relationships between the physical entities in the master node and the subscriber nodes can be established, but also the mapping relationships between the physical entities in the master node and the physical entities in the subscriber nodes can be established, therefore, the master node can know the data distribution among different physical entities in the subscriber node, thereby realizing the load balance among physical entities within each subscriber node.

In further, in the device for peer-to-peer data replication provided by embodiments of the present invention, the processor is further configured to: when a new subscriber node is connected to the master node, synchronize commit redo records to the new subscriber node after physical entities in the master node and mapping relationships between the physical entities and the subscriber nodes including the new subscriber node are reconfigured.

According to the device for peer-to-peer data replication provided by embodiments of the present invention, the single master replication topology can be extended conveniently.

In further, in the device for peer-to-peer data replication provided by embodiments of the present invention, the first commit record is separated from a second commit record, which is generated by the device when a second write operation happens on a second physical entity, based on physical entities on which the related write operation happens.

The first commit record and the second commit record are pushed, in parallel, by the processor, to the first subscriber node and the second subscriber node, respectively, so that the first commit record and the second commit record are replayed, in parallel, by the first subscriber node and the second subscriber node, respectively; where, the second commit redo record is used for replicating data of the second write operation from the master node to the second subscriber node corresponding to the second physical entity, and then to the first subscriber node through pushing, by the second subscriber node, the received second commit redo record, to the first subscriber node.

According to the device for peer-to-peer data replication provided by embodiments of the present invention, the data of the master node can be separated and transmitted to different subscriber nodes easily and conveniently, thus the performance of the master node can be improved in further.

Further, as shown in FIG. 21, the device for peer-to-peer data replication may also include a communication interface 213, configured to complete the communication between the device for peer-to-peer data replication and other devices such as the master node and the subscriber nodes.

As shown in FIG. 21, the device for peer-to-peer data replication may also include a disk 214, configured to store related information during data replication. It should be understood by persons skilled in the art, the device for peer-to-peer data replication may be the master node while the disk 214 is acted as the physical entities of the master node.

Alternatively, in specific implementation, if the memory 212, the processor 211, the communication interface 213 and the disk 214 can be implemented individually, then the memory 212, the processor 211, the communication interface 213 and the disk 214 can be in communication connection via BUS. The BUS can be Industry Standard Architecture (ISA) BUS, Peripheral Component (PCI) BUS or Extended Industry Standard Architecture (EISA) BUS etc. The BUS can be divided into address BUS, data BUS and control BUS etc. For convenient representation, the BUS is only represented by a single thick line, but does not mean there is only one BUS or one kind of BUS.

Alternatively, in specific implementation, if the memory 212, the processor 211, the communication interface 213 and the disk 214 can be integrated in a single chip, then the memory 212, the processor 211 the communication interface 213 and the disk 214 can be in communication connection via internal interface.

Figure 22:
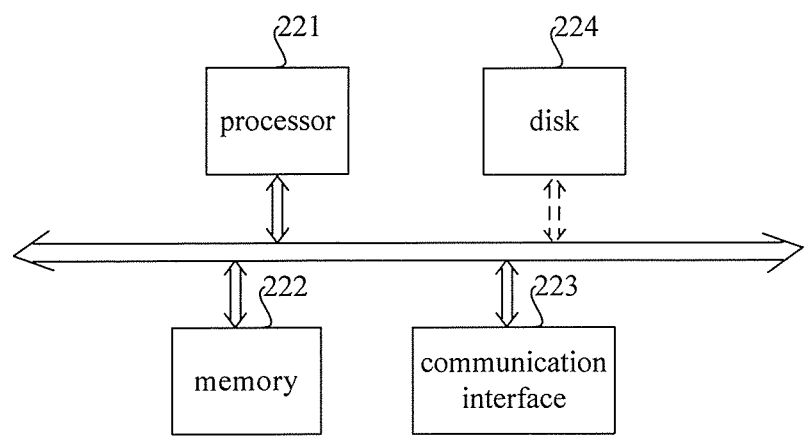
FIG. 22 is a schematic structure diagram of a device for peer-to-peer data replication according to another embodiment of the present invention.

FIG. 22 is a schematic structure diagram of a device for peer-to-peer data replication according to another embodiment of the present invention. The device for peer-to-peer data replication shown in FIG. 22 may be positioned on a subscriber node. As shown in FIG. 22, device for peer-to-peer data replication includes a processor 221 and a memory 222 coupled to the processor 221.

The memory 221, configured to store program. Specifically, the program may include program code, and the program code may include computer operating instruction.

The processor 221 is configured to: receive a commit redo record attached with a CSN from a master node, where the CSN attached in the commit redo record is used for indicating the sequence of a write operation within the master node; update a CSN of the subscriber node to the CSN attached to the commit redo record, when an absolute value of the CSN attached to the commit redo record minus the CSN of the subscriber node is 1, where the CSN of the subscriber node is set to 0 during an initialization; and replay the commit redo record to replicate data of a write operation happened on a master node from the master node to the subscriber node, where the subscriber node is connected to the master node and other subscriber nodes connected to the master node; and push the commit redo record to the other subscriber nodes, to replicate the data of the write operation happened on the master node to the other subscribers.

The memory 222 may include a high speed RAM and a non-volatile memory.

The processor 221 may be a Central Processing Unit (CPU), or can be Application Specific Integrated Circuit (ASIC), or can be configured to one or more ASIC.

The details of performing peer-to-peer data replication by the device for peer-to-peer data replication according to embodiments of the present invention please refer to the above method embodiments, which will not be repeated here.

According to the device for peer-to-peer data replication provided by embodiments of the present invention, the transmission between the master node and the subscriber nodes can be reduced and, thus, the replication bottleneck from the master node in a replication cluster can be mitigated.

Further, in the device for peer-to-peer data replication provided by embodiments of the present invention, the processor is further configured to: save the received commit redo record and wait for another commit redo record, when the absolute value of the CSN attached to the received commit redo record minus the CSN of the subscriber node is not 1; and replay the commit redo record to replicate data of the write operation happened on the master node from the master node to the subscriber node, after the CSN of the subscriber node is updated to a value that the absolute value of the CSN attached to the received commit redo record minus the updated CSN of the subscriber node is 1.

According to the device for peer-to-peer data replication provided by embodiments of the present invention, even the commit redo records received by the subscriber node are out of order, the correct replication can be guaranteed.

Further, in the device for peer-to-peer data replication provided by embodiments of the present invention, the processor is further configured to: transmit a pull request to all other subscriber nodes to get all data of the write operation happened on the master node, which is obtained by replaying the commit redo record, in the other subscriber nodes after the master node is down and the subscriber node is elected to be a new master node; and when the subscriber node is acted as the new master node, reassign mapping relationships between physical entities in the new master node and the other subscriber nodes other than the subscriber node which is act as the new master node.

Optionally, the processor is further configured to transmit the data of the write operation happened on the former master node in the subscriber node to a subscriber node which is acted as a new master node in response to a pull request transmitted by the new master node, after the former master node is down and another subscriber node is elected to be the new master node.

According to the device for peer-to-peer data replication provided by embodiments of the present invention, when the master node is down, the subscriber nodes have ability to make a cluster including the subscriber nodes recover and return to work quickly.

As shown in FIG. 22, the device for peer-to-peer data replication may also include a disk 224, configured to store related information during data replication. It should be understood by persons skilled in the art, the device for peer-to-peer data replication may be the subscriber node while the disk 224 is acted as the physical entities of the subscriber node.

Alternatively, in specific implementation, if the memory 222, the processor 221, the communication interface 223 and the disk 224 can be implemented individually, then the memory 222, the processor 221, the communication interface 223 and the disk 224 can be in communication connection via BUS. The BUS can be Industry Standard Architecture (ISA) BUS, Peripheral Component (PCI) BUS or Extended Industry Standard Architecture (EISA) BUS etc. The BUS can be divided into address BUS, data BUS and control BUS etc. For convenient representation, the BUS is only represented by a single thick line, but does not mean there is only one BUS or one kind of BUS.

Alternatively, in specific implementation, if the memory 222, the processor 221, the communication interface 223 and the disk 224 can be integrated in a single chip, then the memory 222, the processor 221 the communication interface 223 and the disk 224 can be in communication connection via internal interface.

Figure 23:
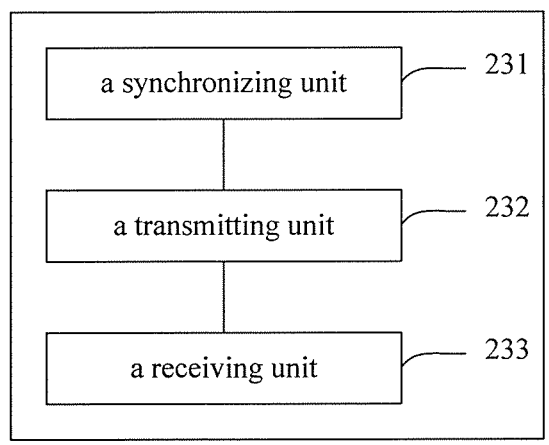
FIG. 23 is a schematic structure diagram of a device for master node switching according to an embodiment of the present invention.

FIG. 23 is a schematic structure diagram of a device for master node switching according to an embodiment of the present invention. The device for master node switching shown in FIG. 23 may be positioned on a subscriber node. As shown in FIG. 23, the device includes:

a synchronizing unit 231, configured to, when a master node is down, perform data synchronization among the subscriber node and the other subscriber nodes until the data synchronization is finished or a pre-configured time period for the data synchronization is reached, where the subscriber nodes and the master node are in a same cluster;

a transmitting unit 232, configured to transmit a pull request to the remaining subscriber nodes which are not elected to be a new master node, after the subscriber node is selected from the subscriber nodes to be the new master node based on a highest commit sequence number (CSN) of the subscriber nodes; and a receiving unit 233, configured to receive data from the remaining subscriber nodes which are not elected to be the new master node.

The details of performing master node switching by the device for master node switching according to embodiments of the present invention please refer to the above method embodiments, which will not be repeated here.

According to the device for master node switching provided by embodiments of the present invention, when the master node is down, the subscriber nodes have ability to make a cluster including the subscriber nodes recover and return to work quickly.

Figure 24:
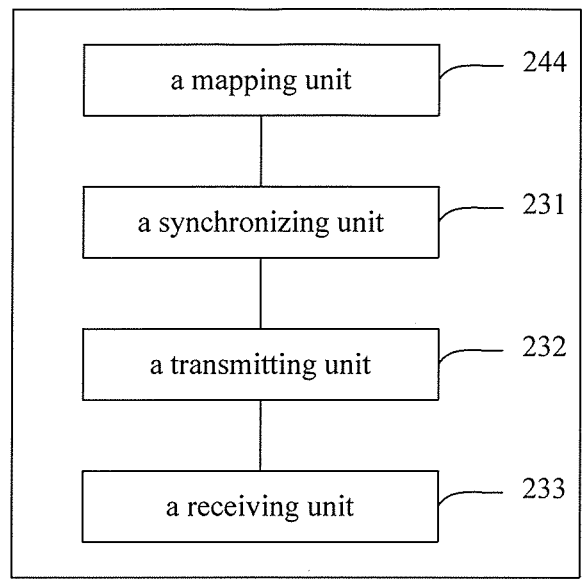
FIG. 24 is a schematic structure diagram of a device for master node switching according to another embodiment of the present invention.

In further, FIG. 24 is a schematic structure diagram of a device for master node switching according to another embodiment of the present invention. As shown in FIG. 24, the device for master node switching provided by embodiments of the present invention may also include a mapping unit 244, configured to, when the subscriber node is acted as the new master node, establish mapping relationships between physical entities in the new master node and the other subscriber nodes other than the subscriber node;

and the synchronizing unit is further configured to perform peer-to-peer data replication between the new master node and the other subscriber nodes which are not elected to be the new master node according to the mapping relationships, when a write operation happens on the physical entity in the new master node.

According to the device for master node switching provided by embodiments of the present invention, when the master node is down, the cluster including the subscriber nodes recover can recover and return to perform the method for peer-to-peer data replication provided by embodiments of the present invention.

Figure 25:
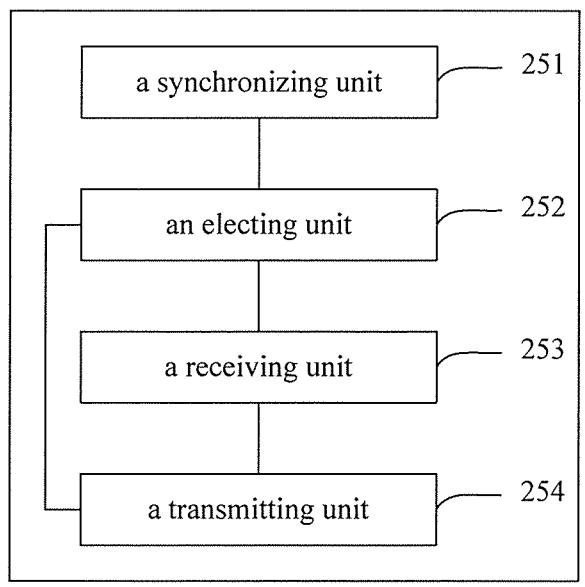
FIG. 25 is a schematic structure diagram of a device for master node switching according to an embodiment of the present invention.

FIG. 25 is a schematic structure diagram of a device for master node switching according to an embodiment of the present invention. The device for master node switching shown in FIG. 25 may be positioned on a subscriber node. As shown in FIG. 25, the device includes:

a synchronizing unit 251, configured to, when a master node is down, perform data synchronization among the subscriber node and the other subscriber nodes until the data synchronization is finished or a pre-configured time period for the data synchronization is reached, where the subscriber nodes and the master node are in a same cluster;

an electing unit 252, configured to, together with the other subscriber node, elect a subscriber node to be a new master node from the subscriber nodes based on a highest commit sequence number (CSN) of the subscriber node;

a receiving unit 253, configured to, when the subscriber node is not elected to be the new master node, receive a pull request issued by the new master node; and a transmitting unit 254, configured to, when the subscriber node is not elected to be the new master node, transmit data in the subscriber node to a new master node in response to the pull request transmitted by the new master node.

The details of performing master node switching by the device for master node switching according to embodiments of the present invention please refer to the above method embodiments, which will not be repeated here.

According to the device for master node switching provided by embodiments of the present invention, when the master node is down, the subscriber nodes have ability to make a cluster including the subscriber nodes recover and return to work quickly.

Figure 26:
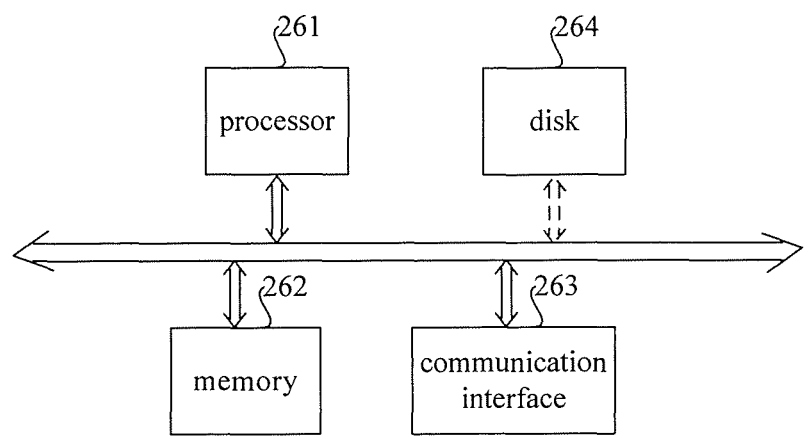
FIG. 26 is a schematic structure diagram of a device for master node switching according to an embodiment of the present invention.

FIG. 26 is a schematic structure diagram of a device for master node switching according to an embodiment of the present invention. The device for master node switching shown in FIG. 26 may be positioned on a subscriber node. As shown in FIG. 26, the device includes a processor 261 and a memory 262 coupled to the processor 261.

The memory 261 is configured to store program. Specifically, the program may include program code, and the program code may include computer operating instruction.

The processor 261 is configured to: when a master node is down, perform data synchronization among the subscriber node and the other subscriber nodes until the data synchronization is finished or a pre-configured time period for the data synchronization is reached, where the subscriber nodes and the master node are in a same cluster; transmit a pull request to the remaining subscriber nodes which are not elected to be a new master node, after the subscriber node is selected from the subscriber nodes to be the new master node based on a highest commit sequence number (CSN) of the subscriber nodes; and receive data from the remaining subscriber nodes which are not elected to be the new master node.

The details of performing master node switching by the device for master node switching according to embodiments of the present invention please refer to the above method embodiments, which will not be repeated here.

According to the device for master node switching provided by embodiments of the present invention, when the master node is down, the subscriber nodes have ability to make a cluster including the subscriber nodes recover and return to work quickly.

In further, the processor is further configured to, when the subscriber node is acted as the new master node, establish mapping relationships between physical entities in the new master node and the other subscriber nodes other than the subscriber node; and, when a write operation happens on the physical entity in the new master node, perform peer-to-peer data replication between the new master node and the other subscriber nodes which are not elected to be the new master node according to the mapping relationships.

According to the device for master node switching provided by embodiments of the present invention, when the master node is down, the cluster including the subscriber nodes recover can recover and return to perform the method for peer-to-peer data replication provided by embodiments of the present invention.

Further, as shown in FIG. 26, the device for master node switching may also include a communication interface 263, configured to complete the communication between the device for peer-to-peer data replication and other devices such as the master node and other subscriber nodes.

As shown in FIG. 26, the device for master node switching may also include a disk 264, configured to store related information during data replication. It should be understood by persons skilled in the art, the device for master node switching may be the subscriber node while the disk 264 is acted as the physical entities of the subscriber node.

Alternatively, in specific implementation, if the memory 262, the processor 261, the communication interface 263 and the disk 264 can be implemented individually, then the memory 262, the processor 261, the communication interface 263 and the disk 264 can be in communication connection via BUS. The BUS can be Industry Standard Architecture (ISA) BUS, Peripheral Component (PCI) BUS or Extended Industry Standard Architecture (EISA) BUS etc. The BUS can be divided into address BUS, data BUS and control BUS etc. For convenient representation, the BUS is only represented by a single thick line, but does not mean there is only one BUS or one kind of BUS.

Alternatively, in specific implementation, if the memory 262, the processor 261, the communication interface 263 and the disk 264 can be integrated in a single chip, then the memory 262, the processor 261 the communication interface 263 and the disk 264 can be in communication connection via internal interface.

Figure 27:
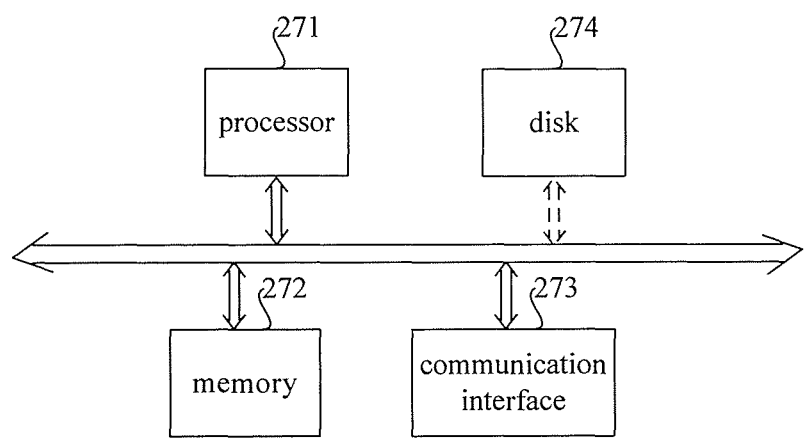
FIG. 27 is a schematic structure diagram of a device for master node switching according to an embodiment of the present invention.

FIG. 27 is a schematic structure diagram of a device for master node switching according to an embodiment of the present invention. The device for master node switching shown in FIG. 27 may be positioned on a subscriber node. As shown in FIG. 27, the device includes a processor 271 and a memory 272 coupled to the processor 271.

The memory 271 is configured to store program. Specifically, the program may include program code, and the program code may include computer operating instruction.

The processor 271 is configured to: when a master node is down, perform data synchronization among the subscriber node and the other subscriber nodes until the data synchronization is finished or a pre-configured time period for the data synchronization is reached, where the subscriber nodes and the master node are in a same cluster; together with the other subscriber node, elect a subscriber node to be a new master node from the subscriber nodes based on a highest commit sequence number (CSN) of the subscriber node; when the subscriber node is not elected to be the new master node, receive a pull request issued by the new master node; and when the subscriber node is not elected to be the new master node, transmit data in the subscriber node to a new master node in response to the pull request transmitted by the new master node.

The details of performing master node switching by the device for master node switching according to embodiments of the present invention please refer to the above method embodiments, which will not be repeated here.

According to the device for master node switching provided by embodiments of the present invention, when the master node is down, the subscriber nodes have ability to make a cluster including the subscriber nodes recover and return to work quickly.

Further, as shown in FIG. 27, the device for master node switching may also include a communication interface 273, configured to complete the communication between the device for peer-to-peer data replication and other devices such as the master node and other subscriber nodes.

As shown in FIG. 27, the device for master node switching may also include a disk 274, configured to store related information during data replication. It should be understood by persons skilled in the art, the device for master node switching may be the subscriber node while the disk 274 is acted as the physical entities of the subscriber node.

Alternatively, in specific implementation, if the memory 272, the processor 271, the communication interface 273 and the disk 274 can be implemented individually, then the memory 272, the processor 271, the communication interface 273 and the disk 274 can be in communication connection via BUS. The BUS can be Industry Standard Architecture (ISA) BUS, Peripheral Component (PCI) BUS or Extended Industry Standard Architecture (EISA) BUS etc. The BUS can be divided into address BUS, data BUS and control BUS etc. For convenient representation, the BUS is only represented by a single thick line, but does not mean there is only one BUS or one kind of BUS.

Alternatively, in specific implementation, if the memory 272, the processor 271, the communication interface 273 and the disk 274 can be integrated in a single chip, then the memory 272, the processor 271 the communication interface 273 and the disk 274 can be in communication connection via internal interface.

Figure 28:
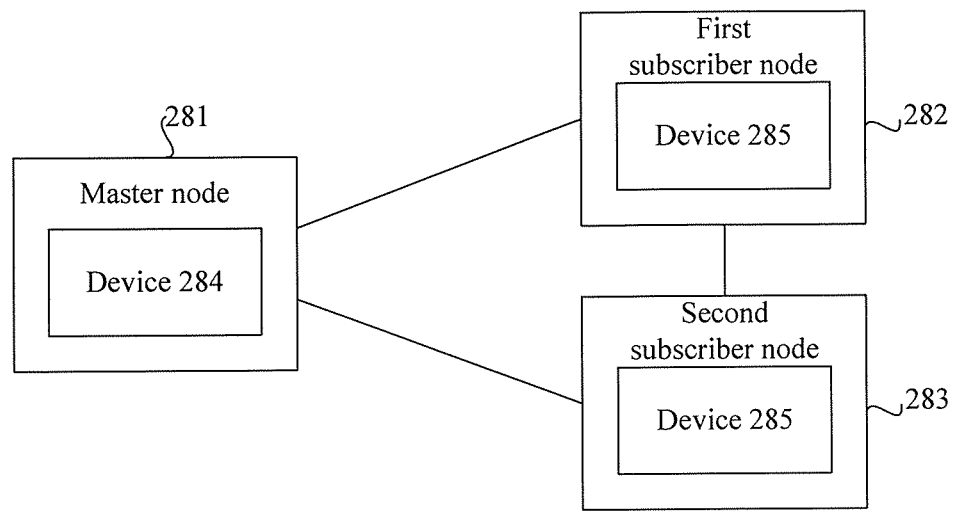
FIG. 28 is a schematic structure diagram of a single master cluster system according to an embodiment of the present invention.

FIG. 28 is a schematic structure diagram of a single master cluster system according to an embodiment of the present invention. As shown in FIG. 28, the system includes a master node 281 and at least two subscriber nodes including a first subscriber node 282 and a second subscriber node 283, where: on the master node 281, a device for peer-to-peer data replication as shown in any one of FIGS. 16-18 and 21 (which is marked as device 284 in FIG. 28); and on each of the subscriber node, a device for peer-to-peer data replication as shown in any one of FIGS. 19, 20 and 22 (which is marked as device 285 in FIG. 28).

The details of performing peer-to-peer data replication by the device for peer-to-peer data replication according to embodiments of the present invention please refer to the above method embodiments, which will not be repeated here.

According to the single master cluster system provided by embodiments of the present invention, the load on the master node can be reduced.

Figure 29:
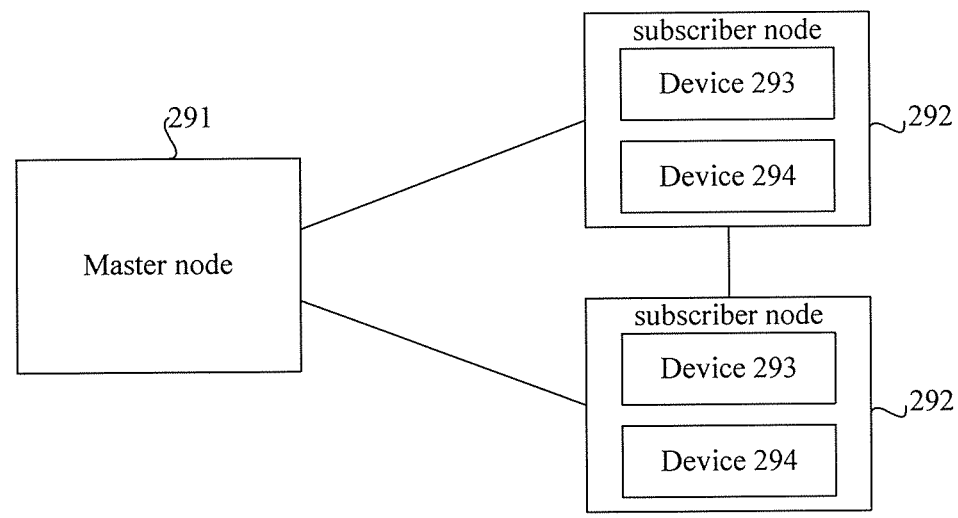
FIG. 29 is a schematic structure diagram of a single master cluster system according to another embodiment of the present invention.

FIG. 29 is a schematic structure diagram of a single master cluster system according to another embodiment of the present invention. As shown in FIG. 29, the system includes a master node 291 and at least two subscriber nodes 292, where: on each of the subscriber nodes 292, both a device for master node switching as shown in any one of FIGS. 23, 24 (which is marked as device 293 in FIG. 29) and 26, and a device for master node switching as shown in FIG. 25 or 27 (which is marked as device 294 in FIG. 29).

The details of performing peer-to-peer data replication by the device for peer-to-peer data replication according to embodiments of the present invention please refer to the above method embodiments, which will not be repeated here.

According to the single master cluster system provided by embodiments of the present invention, when the master node is down, the subscriber nodes have ability to make a cluster including the subscriber nodes recover and return to work quickly.

The above are only specific embodiments of the present invention. The protection scope of the present invention, however, is not limited thereto. Any alteration or substitution that is within the technical scope disclosed by the present invention and can easily occur to persons skilled in the art should be covered in the protection scope of the present invention. Hence the protection scope of the present invention should be determined by the statements in Claims.

What is claimed is:

1. A method for peer-to-peer data replication, the method comprising:
generating, by a master node, a first commit redo record, when a first write operation happens on a first physical entity in the master node;
generating, by the master node, a second commit redo record when a second write operation happens on a second physical entity in the master node;
wherein the master node is preset with at least two physical entities including the first physical entity and the second physical entity and the master node is connected to at least two subscriber nodes including a first subscriber node and a second subscriber node, and wherein the mapping relationships between the physical entities and the subscriber nodes are established by the master node by mapping different subscriber nodes to different connections between the master node and the subscriber nodes, and by mapping different connections to different sets of physical entities in the master node, wherein each set of physical entities comprises one or multiple physical entities;
pushing, by the master node, the first commit redo record to the first subscriber node corresponding to the first physical entity based on mapping relationships between the physical entities and the subscriber nodes, wherein the first commit redo record is used for replicating data of the first write operation from the master node to the first subscriber node corresponding to the first physical entity, and then to the second subscriber node through pushing, by the first subscriber node, the received first commit redo record, to the second subscriber node; and
pushing, by the master node, the second commit redo record to the second subscriber node corresponding to the second physical entity based on mapping relationships between the physical entities and the subscriber nodes, wherein the second commit redo record is used for replicating data of the second write operation from the master node to the second subscriber node to the second physical entity.

2. The method according to claim 1, wherein the physical entities are table space, device files, pages or partitions.

3. The method according to claim 1, wherein:
the pushing, by the master node, the first commit redo record to a first subscriber node corresponding to the first physical entity based on mapping relationships between the physical entities and the subscriber nodes, comprises:
pushing, by the master node, the first commit redo record to the first subscriber node corresponding to the first physical entity based on the mapping relationship between the first physical entity and the first subscriber node through a connection between the master node and the first subscriber node.

4. The method according to claim 1, wherein:
the mapping relationships between the physical entities and the subscriber nodes are further established by mapping different physical entities in one set of physical entities in the master node to different physical entities in the subscriber node corresponding to the set of physical entities; and
pushing, by the master node, the first commit redo record to the first subscriber node corresponding to the first physical entity based on mapping relationships between the physical entities and the subscriber nodes, comprises:
pushing, by the master node, the first commit redo record to a third physical entity corresponding to the first physical entity, wherein the first subscriber node is preset with at least two physical entities including the third physical entity and a fourth physical entity, based on the mapping relationship between the set of physical entities to which the first physical entity belongs and that is of the master node, and the first subscriber node and the mapping relationship between the first physical entity and the third physical entity, through a connection between the master node and the first subscriber node.

5. The method according to claim 1, wherein the first commit record and the second commit record are pushed, in parallel, by the master node, to the first subscriber node and the second subscriber node, respectively, so that the first commit record and the second commit record are replayed, in parallel, by the first subscriber node and the second subscriber node, respectively; wherein, the second commit redo record is used for replicating data of the second write operation from the master node to the second subscriber node corresponding to the second physical entity, and then to the first subscriber node through pushing, by the second subscriber node, the received second commit redo record, to the first subscriber node.

6. A master node, comprising:
  memory; and
  a processor coupled to the memory, wherein the processor is configured to:
    generate a first commit redo record when a first write operation happens on a first physical entity in the master node,
    generating, by the master node, a second commit redo record when a second write operation happens on a second physical entity in the master node,
    wherein the master node is preset with at least two physical entities including the first physical entity and a second physical entity and the master node is connected to at least two subscriber nodes including a first subscriber node and a second subscriber node,
    establish mapping relationships between the physical entities and the subscriber nodes by mapping different subscriber nodes to different connections between the master node and the subscriber nodes, and by mapping different connections to different sets of physical entities in the master node, wherein each set of physical entities comprises one or multiple physical entities,
    push the first commit redo record to a first subscriber node corresponding to the first physical entity based on the established mapping relationships between the physical entities and the subscriber nodes, wherein the first commit redo record is used for replicating data of the first write operation from the master node to the first subscriber node corresponding to the first physical entity, and then to the second subscriber node through pushing, by the first subscriber node, the received first commit redo record, to the second subscriber node, and
    pushing, by the master node, the second commit redo record to the second subscriber node corresponding to the second physical entity based on mapping relationships between the physical entities and the subscriber nodes, wherein the second commit redo record is used for replicating data of the second write operation from the master node to the second subscriber node to the second physical entity.

7. The master node according to claim 6, wherein the physical entities are table space, device files, pages and/or partitions.

8. The master node according to claim 6, wherein the processor is further configured to:
  push the first commit redo record to the first subscriber node corresponding to the first physical entity based on the mapping relationship between the first physical entity and the first subscriber node through a connection between the master node and the first subscriber node.

9. The master node according to claim 6, wherein the processor is further configured to:
  further establish the mapping relationships by mapping different physical entities in one set of physical entities in the master node to different physical entities in the subscriber node corresponding to the set of physical entities; and
  push the first commit redo record to a third physical entity corresponding to the first physical entity, wherein the first subscriber node is preset with at least two physical entities including the third physical entity and a fourth physical entity, based on the mapping relationship between the set of physical entities to which the first physical entity belongs and that is of the master node and the first subscriber node and the mapping relationship between the first physical entity and the third physical entity, through a connection between the master node and the first subscriber node.

10. The master node according to claim 6, wherein the first commit record and the second commit record are pushed, in parallel, by the processor, to the first subscriber node and the second subscriber node, respectively, so that the first commit record and the second commit record are replayed, in parallel, by the first subscriber node and the second subscriber node, respectively; wherein, the second commit redo record is used for replicating data of the second write operation from the master node to the second subscriber node corresponding to the second physical entity, and then to the first subscriber node through pushing, by the second subscriber node, the received second commit redo record, to the first subscriber node.

11. The method for peer-to-peer data replication of claim 1, further comprising:
  when a new subscriber node is connected to the master node, synchronizing, by the master node, commit redo records to the new subscriber node after physical entities in the master node and mapping relationships between the physical entities and the subscriber nodes including the new subscriber node are reconfigured.

12. The master node of claim 6, wherein the processor is further configured to:
  when a new subscriber node is connected to the master node, synchronize commit redo records to the new subscriber node after physical entities in the master node and mapping relationships between the physical entities and the subscriber nodes including the new subscriber node are reconfigured.

* * * * *